(12) United States Patent
Matthews et al.

(10) Patent No.: US 11,425,195 B1
(45) Date of Patent: Aug. 23, 2022

(54) MASSIVELY PARALLEL IN-NETWORK COMPUTE

(71) Applicant: Innovium, Inc., San Jose, CA (US)

(72) Inventors: William Brad Matthews, San Jose, CA (US); Puneet Agarwal, Cupertino, CA (US); Bruce Hui Kwan, Sunnyvale, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 17/200,463

(22) Filed: Mar. 12, 2021

(51) Int. Cl.
| | | |
|---|---|---|
| *H04L 67/1074* | (2022.01) | |
| *H04L 49/15* | (2022.01) | |
| *G06N 20/00* | (2019.01) | |
| *G06N 3/04* | (2006.01) | |
| *H04L 45/00* | (2022.01) | |
| *H04L 45/02* | (2022.01) | |

(52) U.S. Cl.
CPC ....... *H04L 67/1076* (2013.01); *G06N 3/0454* (2013.01); *G06N 20/00* (2019.01); *H04L 49/15* (2013.01); *H04L 45/08* (2013.01)

(58) Field of Classification Search
CPC ..... H04L 49/15; H04L 67/1076; G06N 20/00; G06N 3/0454
See application file for complete search history.

(56) References Cited

U.S. PATENT DOCUMENTS

| | | | |
|---|---|---|---|
| 10,167,800 B1 * | 1/2019 | Chung | G06F 17/16 |
| 11,048,661 B2 * | 6/2021 | Sankaralingam | G06F 15/825 |
| 2011/0060891 A1 * | 3/2011 | Jia | G06F 9/5066 |
| | | | 712/220 |
| 2019/0188239 A1 * | 6/2019 | Serrano | G06F 9/38 |
| 2019/0303387 A1 * | 10/2019 | Smarda | G06F 9/4843 |

OTHER PUBLICATIONS

Sapio, Amedeo et al. "Scaling Distributed Machine Learning with In-Network Aggregation." ArXiv abs/1903.06701. (Year: 2020).*
Wickramasinghe, Udayanga S. and Andrew Lumsdaine. "A Survey of Methods for Collective Communication Optimization and Tuning." ArXiv abs/1611.06334. (Year: 2016).*
He, Taiping et al. "High-Performance Support Vector Machines and Its Applications." ArXiv abs/1905.00331. (Year: 2019).*

* cited by examiner

*Primary Examiner* — John M Macilwinen
(74) *Attorney, Agent, or Firm* — Wong & Rees LLP

(57) ABSTRACT

Efficient scaling of in-network compute operations to large numbers of compute nodes is disclosed. Each compute node is connected to a same plurality of network compute nodes, such as compute-enabled network switches. Compute processes at the compute nodes generate local gradients or other vectors by, for instance, performing a forward pass on a neural network. Each vector comprises values for a same set of vector elements. Each network compute node is assigned to, based on the local vectors, reduce vector data for a different a subset of the vector elements. Each network compute node returns a result chunk for the elements it processed back to each of the compute nodes, whereby each compute node receives the full result vector. This configuration may, in some embodiments, reduce buffering, processing, and/or other resource requirements for the network compute node or network at large.

9 Claims, 13 Drawing Sheets

MASSIVELY PARALLEL IN-NETWORK COMPUTE

TECHNICAL FIELD

Embodiments relate generally to distributed computing systems, and, more specifically, to network switch-based architectures for distributed machine learning systems and other applications.

CROSS-REFERENCE TO RELATED APPLICATIONS

This application is related to: U.S. patent application Ser. No. 16/409,695, filed on May 10, 2019, entitled "Network Switch with Integrated Compute Subsystem for Distributed Artificial Intelligence and Other Applications," by Matthews, et al.; U.S. patent application Ser. No. 16/409,699, filed on May 10, 2019, entitled "Egress-Based Compute Architecture for Network Switches in Distributed Artificial Intelligence and Other Applications," by Matthews, et al.; U.S. patent application Ser. No. 16/409,701, filed on May 10, 2019, entitled "Parallelized Ingress Compute Architecture for Network Switches in Distributed Artificial Intelligence and Other Applications," by Matthews, et al.; U.S. patent application Ser. No. 16/409,703, filed on May 10, 2019, entitled "Network Switch with Integrated Gradient Aggregation for Distributed Machine Learning," by Matthews, et al.; and U.S. patent application Ser. No. 16/552,938, filed on Aug. 27, 2019, entitled "Distributed Artificial Intelligence Extension Modules For Network Switches," by Matthews, et al. The entire contents of each of these applications are hereby incorporated by reference for all purposes as if fully set forth herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computationally-intense applications in computing systems can often be implemented by dividing the applications into distinct tasks that can be performed in parallel, and distributing those tasks amongst a number of computing devices. These computing devices are typically interconnected by a communications network via which they share data related to the computations, and are said to form a distributed computing system. Distributed computing systems may be used in a large variety of complex computing applications, such as, without limitation, simulations, language translation, image recognition, fraud detection, and so forth, as well as emerging applications.

For example, machine learning algorithms, and deep learning algorithms in particular, are commonly used to create computational models that perform mission critical computing functions. Such models may involve oft-complex series of calculations that input and process a set of values (often referred to as an input vector or feature vector) to generate an output value or values. The output value(s) generally classify the input vector in some manner. For instance, the output of a model used for image recognition might classify an input vector of pixels, image attributes, or other image data as being either a dog or cat, depending on the purpose of the neural network. A model may include a variety of parameters, such as weights, biases, coefficients, support vectors, and so forth, that affect how the input values are processed and how the output value(s) are calculated.

Example types of models may include, without limitation, neural networks or belief networks, which pass input values through one or more layers of interconnected nodes (referred to herein as "neurons"). Each neuron of a neural network accepts one or more inputs from the input vector and/or other neurons. These inputs form the connections of the neural network. Each neuron is associated with an output function that computes the value output from the neuron based on the inputs to the neuron. The connections may be assigned weights. The weight of a connection, generally speaking, controls how heavily the input associated with that connection factors into the output function. For instance, a neuron might have an input p0 with a weight of 0.4 and an input p1 with a weight of 0.2. The value of the input p0 may therefore more heavily impact the output of the neuron (e.g., in the case of a simple summation of the products of each input and their weights, twice as much).

In some embodiments, the neurons may be organized into two or more layers, including an input layer wherein each neuron outputs a value of the input vector, zero or more intermediate layers in which each neuron inputs one or more values output by an immediately previous layer and then outputs values to one or more neurons of an immediately subsequent layer, and a final output layer that inputs values output by an immediately previous layer and outputs the results of the neural network.

By carefully setting the weights and/or other parameters of a neural network or other model, the model may be configured to accurately or semi-accurately make classifications or other determinations based on input vectors. Suitable weights for a model configured to make a certain type of determination based on a certain type of data may be "learned" through various training algorithms. These training algorithms iteratively adjust the weights over time through a series of steps, including a forward pass, loss computation, and backward pass, until arriving at an "optimal" set of weights for the model, or until all training data has been processed.

The forward pass through the model processes an input vector selected from a suitable set of vectors (e.g., a set of "training data") using a test set of weights to produce an output often referred to herein as a prediction. The loss computation computes the error in that prediction using linear regression or any other suitable technique. From the error, a gradient descent algorithm calculates (e.g. using partial derivatives or other means) a gradient vector comprising a number of gradient elements. Each gradient element corresponds to a different weight of the model, and indicates an adjustment to (e.g. an absolute or relative amount by which to change) the corresponding weight. The gradient descent algorithm selects the adjustment in a manner intended to minimize the computed loss in subsequent iterations. Finally, the backward pass updates the test weights in the model based on the corresponding gradient element so as to arrive at a new set of weights to test. The training process is repeated until arriving at some terminal condition, such as the performance of a certain number of iterations, or the loss computation determining that the latest parameters have achieved what is considered to be an acceptable or optimal loss, depending on the embodiment.

Distributed deep learning techniques have been developed in which training tasks are spread out across any number of physically networked computing devices, referred to as "compute nodes." Each compute node comprises one or more compute entities, such as central processing units ("CPUs"), graphics processing units ("GPUs"), tensor processing units ("TPUs"), floating point units ("FPUs"), or other accelerators, configured to perform compute processes, such as training a model. For example, each compute node may be assigned a different set of input vectors (e.g., from a set of training data) to process with the model. The compute nodes share local gradients from forward passes of their respective input vectors over a physical network, such as a local area network, via which they are connected. These gradients are reduced together in a "reduction" phase to form a result gradient. The compute nodes then use the result gradient in a backward pass to determine new weights to test for the model. Another approach is model parallelism, where portions of the model are assigned to each compute node and the interconnections (e.g., activations) between the various model layers are sent via the physical network as part of the forward pass.

Early distributed deep learning approaches made use of a centralized parameter server to reduce gradients and return results to compute nodes. In such approaches, the centralized parameter server is typically implemented using the same hardware as any other compute node, having significant computing power but limited connectivity. The centralized parameter server is therefore often a significant bottleneck, on account of network latency and/or limited network bandwidth to and from the centralized parameter server.

Another common distributed approach is known as "All Reduce." Each compute node assumes responsibility for reducing a different gradient portion. Each node generates a gradient. Each node then sends to each other node the portion of that gradient that the other node is responsible for reducing. Each node then reduces the portions it receives together and returns the resulting reduced portion back to each other node. This approach places significant demands on the network interconnecting the nodes.

Multiple algorithms exist for performing an All Reduce operation. A commonly used approach is "Ring All Reduce." In Ring All Reduce, a first compute node in such a system may be configured to pass on a gradient portion to a second node, which may be configured to reduce or otherwise aggregate the result with the same portion of its gradient. The second node then passes the result on to a third node, and this process repeats in a ring, tree, or other suitable pattern until all of the nodes have combined their chunk of the gradient together. The final result is then passed back through the topology. The amount of time needed to reduce the gradients and propagate the result throughout the system is a significant bottleneck to the learning process.

Another approach, described in the afore-mentioned U.S. application Ser. No. 16/552,938, involves placing compute logic in, or closely coupled to, the same network hardware that is used to interconnect the compute nodes, such as an otherwise conventional layer 2 or layer 3 network switch. Such network hardware may be referred to as a network compute node. A network compute node may be configured to perform any number of collective operations, including reduction, thereby avoiding the need to pass gradients on to a centralized parameter server, while leveraging the high bandwidth and interconnectivity of the underlying networking hardware.

The introduction of compute functionality at the network compute node increases resource demands on the underlying hardware. For instance, the network compute node must devote processing resources to performing the collective operations and buffer resources to storing vector data until it is ready to perform the operations. The additional resource demands of the compute functionality are met by repurposing existing resources of the network hardware—thereby reducing the resources that would otherwise be available for network hardware—and/or by additional hardware that must be added to the network hardware. These resource demands may increase exponentially when processing larger data sets and/or when many compute nodes are involved. Moreover, a large set of compute nodes working together requires significant numbers of network compute nodes, typically interconnected in a hierarchical fashion, with each of the network compute nodes requiring a significant amount of resources to provide compute functionality.

More generally, the communication of data and other information between nodes of distributed computing systems has consistently proven to be a significant bottleneck in the performance of the distributed system.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
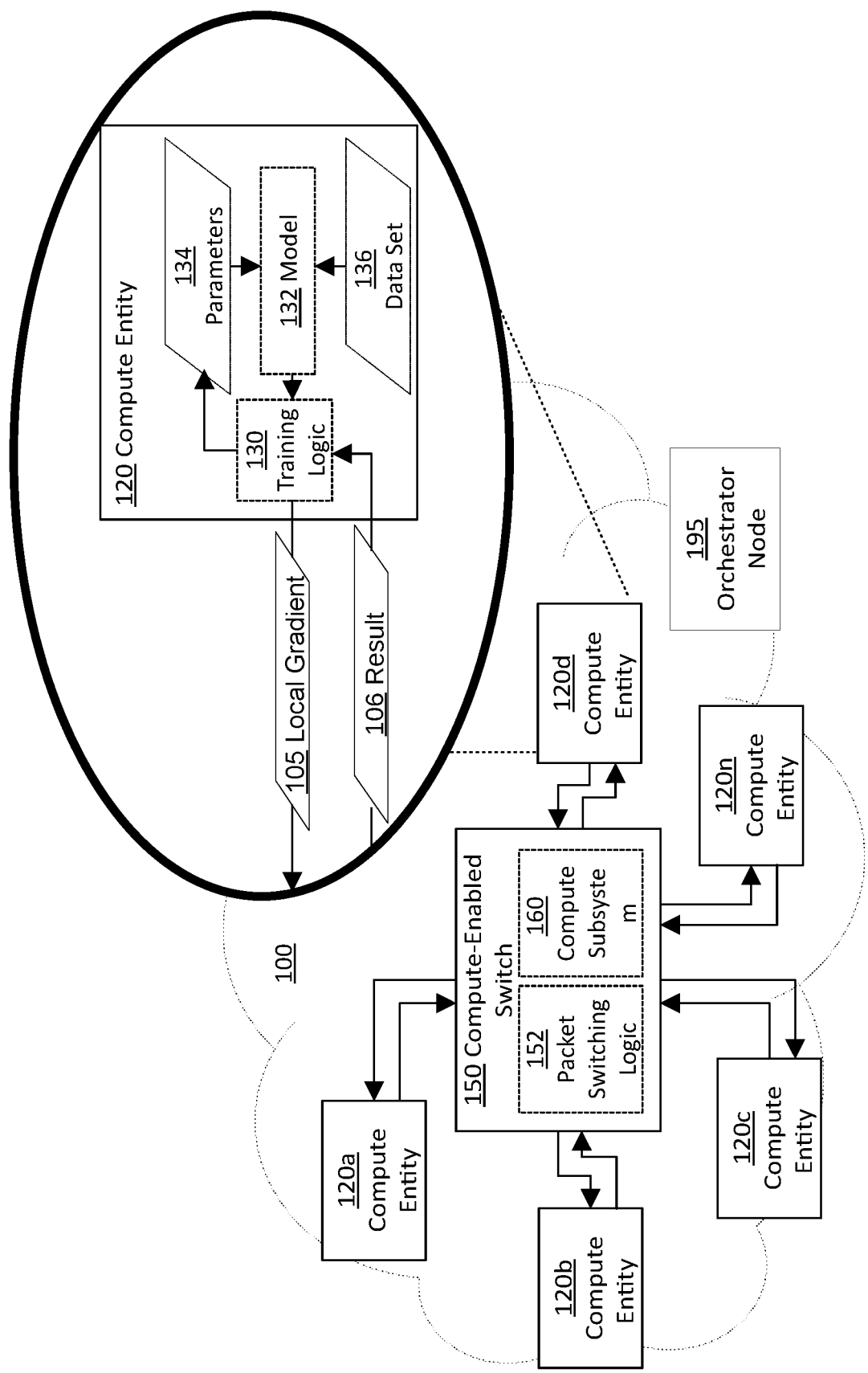
FIG. 1 illustrates an example distributed computing system for machine learning.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

1.0. General Overview

Approaches, techniques, and mechanisms are disclosed for efficiently scaling in-network compute operations to large numbers of compute nodes by connecting each compute node to a same plurality of network compute nodes, such as compute-enabled network switches. Compute processes at the compute nodes generate local gradients or other vectors by, for instance, performing a forward pass on a neural network. Each vector comprises values for a same set of vector elements. These local vectors should be reduced using one or more collective operations, such as aggregation, to produce a result vector, which the compute processes may require before proceeding with further calculations (e.g., to perform a backward pass of the neural network). Each network compute node is assigned to perform the collective operation(s), based on the local vectors, for a different a subset of the vector elements. Each network compute node returns a result chunk for the elements it processed back to each of the compute nodes, whereby each compute node receives the full result vector.

Since a network compute node need not handle or even receive vector portions that do not contain those elements, this configuration may, in some embodiments, reduce buffering, processing, and/or other resource requirements for the network compute node. Moreover, since each of the communication links of a compute node need not be physically connected to the same network compute node, a network compute node may receive and process vectors from many more compute nodes than it might otherwise have been connected to, thereby reducing the need to resort to a hierarchy of network compute nodes to interconnect the compute nodes, along with the complexities and resource demands consequential to such a configuration.

In an embodiment, each compute node comprises a plurality of interconnected compute entities. Each compute entity within that compute node may execute a compute process that generates a local vector for a particular distributed application. For instance, each compute process may use a set of parameters (e.g. weights, biases, etc.) to process a training data set of inputs that has been assigned to the compute process, based upon which the compute process generates a local gradient. Each compute node further comprises a plurality of different communication interfaces. Each interface may be connected, either directly or indirectly, to a different network compute node. Each compute node sends, to each network compute node of these network compute nodes, vector data for a specific subset of vector elements—referred to as a chunk—that the network compute node is responsible for reducing. This vector data may be a corresponding chunk of each local vector, or the compute node may be configured to reduce the chunks locally, and send an intermediate result chunk to the network compute node. Each network compute node reduces the vector elements it is responsible for and returns a final result chunk comprising the reduced values for these vector elements back to each compute node via the corresponding communication interface. When the compute node receives a result chunk from the network compute node, it distributes the result chunk to each of the compute entities.

In an embodiment, each compute entity comprises or is assigned to a specific communication interface. For instance, in an embodiment, a compute entity may be a GPU that is directly coupled to a network interface, such as an Ethernet interface, or Ethernet functionality could be incorporated directly into a GPU. Each compute entity is further responsible for sending all vector data for the specific set of elements that is assigned to the network compute node connected to that communication interface. Hence, each compute entity in a compute node may be interconnected via an intra-node communication mechanism by which it may receive the relevant vector chunks from other compute entities in the compute node. In an embodiment, a compute entity may further be responsible for reducing the vector chunks it receives and sending a resulting reduced chunk to the network compute node. Each compute entity is further responsible for receiving a result chunk from the network compute node connected to its communication interface. The compute entity may share this result chunk with each of the other compute entities in the compute node via the intra-node communication mechanism.

According to an embodiment, a group of compute nodes, and the group of network compute nodes to which that group is connected, may be organized into a compute plane. There may be any number of compute planes involved in a compute task, each operating on a different set of the training data. The network compute node that is operating on a specific subset of vector elements in each compute plane is interconnected with the network compute nodes operating on that specific subset of vector elements in each other compute plane, either directly, or indirectly via a ring, mesh, torus, or other suitable topology. These network compute nodes each produce an intermediate result vector chunk based on the vector chunks they receive from the compute nodes in their respective planes. Then, via their inter-plane connections to other network compute nodes, the network compute nodes combine their intermediate result vector chunks to produce a final result vector chunk to return to the compute nodes in their respective planes.

In other embodiments, the techniques described herein may be applied more generally to any distributed compute task, including tasks unrelated to machine learning. For example, the vectors may comprise values for any set of elements, and not just for gradients or other machine learning constructs. Rather than generating such vectors in a forward pass of a model, the compute processes may have generated such vectors for any purpose using any suitable set of calculations. Moreover, rather than utilizing a result vector for a backward pass of a model, the compute processes may utilize the result vector for any suitable purpose.

2.0. System Overview

2.1. Distributed Learning System

FIG. 1 illustrates an example distributed computing system 100 for machine learning, according to an embodiment. The distributed computing system 100 is a network of computing devices, including compute entities 120*a-n* (collectively "compute entities 120") and the compute-enabled switching device 150. The number of compute entities 120 and compute-enabled switching devices 150 may vary depending on the embodiment. Moreover, the network may include other devices that are not depicted, which may or may not participate in machine learning tasks.

A compute entity 120 may be any suitable type of computing device. For example, a compute entity 120 may be implemented on a server, workstation, or general-purpose computer system. In an embodiment, each compute entity 120 is, or comprises, one or more GPUs, CPUs, TPUs, accelerators, or other hardware configured to perform, among other processes, machine learning tasks. More specifically, each compute entity implements training logic 130 for training a model 132 on a data set 136. The model 132 may be any type of model susceptible to training, including without limitation a neural network, or any other distributed computing operation.

The model 132 has a number of parameters 134 that the training logic 130 may adjust over time. These parameters may be, for instance, weights, biases, or any other parameter of the model 132, depending on the type of model 132 being trained. Over a number of iterations, referred to herein as epochs, the training logic 130 inputs the data from the training data set 136 into the model 132. In an embodiment, each compute entity 120 includes or is coupled a relatively large amount of storage to store the training data set 136, which may or may not be distinct for each entity 120. The entity's training logic 130 executes the model 132 on some or all of the data in its data set 136 using parameters 134 chosen for the current epoch (e.g. by doing a forward pass of a neural network).

The result of executing the model 132 may be a single value, set of values, classification, decision, or any other suitable output. The training logic 130 computes a loss and/or error for this output based on an expected output indicated for the data set 136. Based on this loss and/or error, the training logic 130 computes a gradient 105 (e.g. using a gradient descent algorithm). For any given epoch, each compute entity may compute a different gradient 105 as a result of operating on a different data set 136 (or, in some embodiments, a different set of parameters 134). The gradient 105 generated by an entity's training logic 130 is thus specific to that entity, and therefore referred to as a local gradient 105.

In a non-distributed system, if some terminal condition had not been reached, training logic 130 would complete the epoch by adjusting the parameters 134 based on the local gradient 105, using each gradient element to adjust a corresponding weight or other parameter 134. The training logic 130 would then begin a new epoch. However, in the distributed system, each of the local gradients 105 must be reduced together using some collective operation (e.g. summation, average, minimum, maximum, etc.) to produce a result gradient. The parameters 134 are then adjusted based on the result gradient.

To this end, each compute entity 120 further includes or is coupled to one or more communication interfaces by which the compute entity 120 is connected to the network. Each communication interface of a compute entity 120 enables the compute entity 120 to form direct communication links with other devices on the network, typically by means of cabling plugged into the communication interface of the compute entity 120 on one end and a communication interface of the other device on the other end. However, fixed wiring or wireless communication links may also or instead be utilized. In an embodiment, the links may be indirect, passing through one or more intermediate switch devices.

A compute entity 120 will typically have a direct communication link to a switch, such as switching device 150, which enables indirect communication links to other devices on the network via the switch. In many embodiments, Ethernet-based communications are utilized. However, other communication standards may also or instead be utilized, such as InfiniB and, Fibre Channel, and so forth. In an embodiment, InfiniBand semantics—particularly those related to reliable connections and Remote Direct Memory Access ("RDMA")—may be utilized, even in non-Infini-Band networks. This switch 150 will typically, but need not necessarily, include packet-switching logic 152 for forwarding data units between entities 120 and/or other devices on the network.

A compute-enabled switching device 150, referred to as switch 150 for short, is a network device configured to interconnect a plurality of computing devices, including compute nodes 120. Switch 150 may be, for instance, a top-of-rack ("TOR"), end-of-row ("EOR"), access, aggregation, core, or any other suitable type of network switching device. Switch 150 may take any suitable physical form, including a standalone computing device or a rack-mountable line card within a chassis adapted for hosting any number of computing devices. In an embodiment, switch 150 comprises a plurality of physical ports by which switch 150 may be connected directly to other computing devices via data cables. Switch 150 may further be interconnected to computing devices indirectly, via direct connections to other switches that are directly or indirectly connected to those computing devices. In some embodiments, switch 150 may also or instead include one or more wireless communication interfaces by which switch 150 is directly connected to certain computing devices.

According to an embodiment, to accelerate distributed machine-learning tasks, a switch 150 may include, or be tightly coupled to, a compute subsystem 160. The compute subsystem 160 may be implemented on the same chip as the packet-switching logic 152 or on a separate chip inside the switch 150. In some embodiments, the compute subsystem 160 may be an external module that is plugged directly into one or more Ethernet ports or other interfaces of the switch, as described in the afore mentioned patent application, "Distributed Artificial Intelligence Extension Modules for Network Switches."

A switch with a compute subsystem 160 is referred to herein as a "compute-enabled switch" or a switch with "in-network compute" capabilities. Depending on the network, compute entities 120 may be directly connected to a compute-enabled switch 150, or may be connected to a compute-enabled switch 150 via one or more intermediary switches that are not compute-enabled.

When the switch 150 detects data units that contain local gradients 105 (or other vector data), the switch 150 may forward the data units to the compute subsystem 160. The compute subsystem 160 collects the local gradients 105 for a given distributed application, task, and/or epoch, and performs an associated collective operation to reduce those local gradients 105 into a result gradient. This process may also be described as "reduction," with the result gradient being an example of "reduced data." The compute subsystem 160 then returns a result 106 back to each compute entity 120, which may be the result gradient or, in some embodiments, adjusted parameters 134 that the compute entity 120 should use for the next epoch.

Optionally, system 100 may comprise one or more orchestrator nodes 195. An orchestrator node 195 may be implemented at any computing device within the network, including at the compute entities 120 or the compute-enabled switch 150. The orchestrator node 195 may be responsible for administrative tasks, such as initializing compute entities 120 to execute distributed applications, establishing worker sets, providing data to the compute entities 120 to process, configuring and/or sending compute instructions to the compute-enabled switch 150 as to what data to expect and what operations to perform on that data, and so forth. In an embodiment, the orchestrator node 195 may also or instead coordinate the launching of jobs, resolve communications patterns (e.g. ring allreduce, tree-allreduce, etc.), terminate certain distributed applications, and/or manage resource sharing. In an embodiment, an orchestrator node 195 may comprise interfaces via which a human operator may instruct the orchestrator node 195 to do some or all of the foregoing.

FIG. 1 illustrates but one example distributed computing system in which the described techniques may be applied. Other such systems may include additional or fewer elements in varying arrangements. For instance, gradient 105 may more generally be replaced by any type of vector. Similarly, training logic 130 may be replaced by any suitable compute process that generates a vector and consumes a result vector reduced from that vector and other similar generated by other compute processes. Moreover, other systems may include any number of compute entities 120 as well as additional switches or other network entities.

2.2. Compute Nodes

Figure 2:
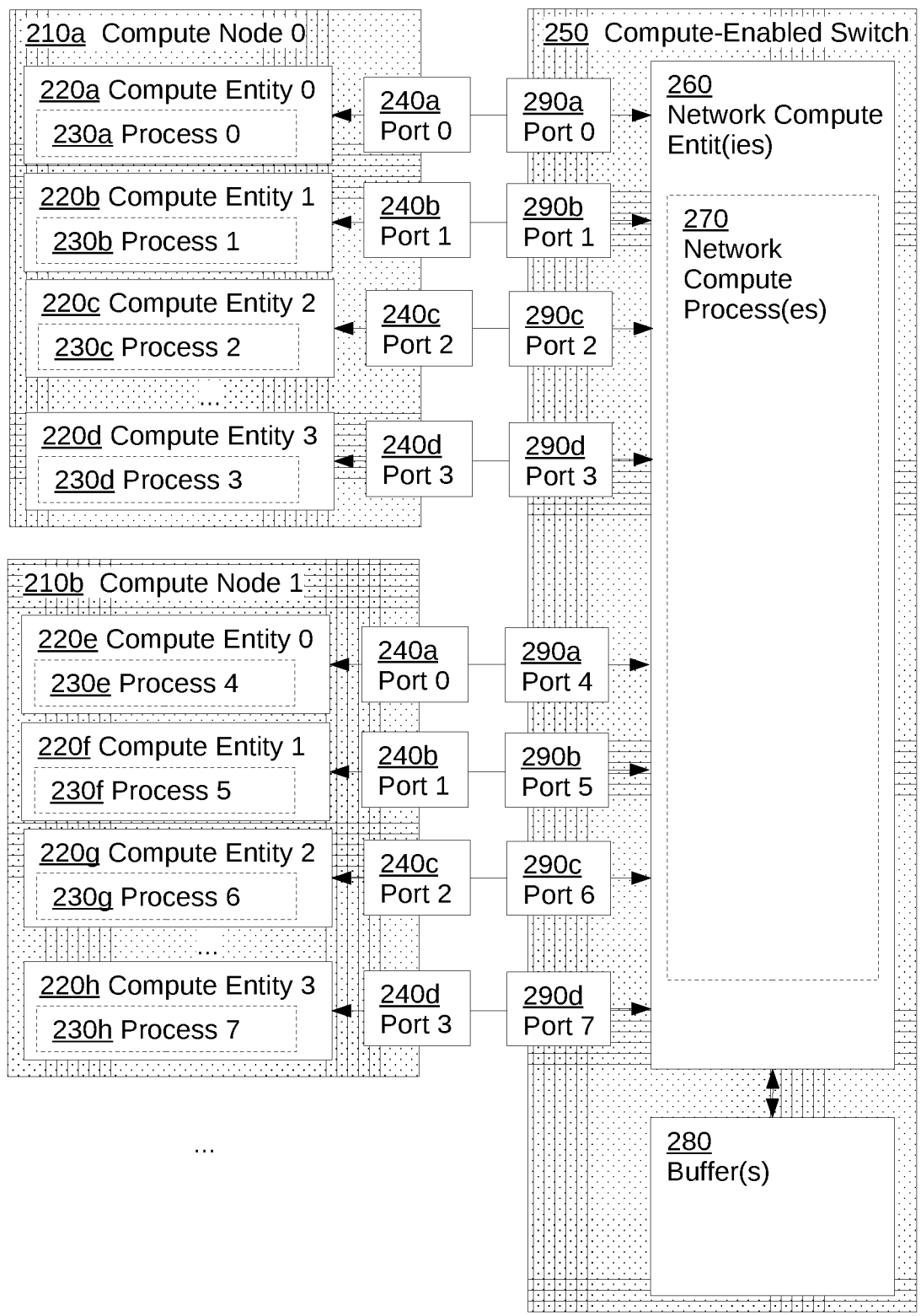
FIG. 2 illustrates an example distributed computing system in which compute entities are organized into compute nodes.

FIG. 2 illustrates an example distributed computing system 200 in which compute entities 220 are organized into compute nodes 210, according to an embodiment. Each compute node 210 is a separate physical grouping of compute entities 220, typically coupling its constituent compute entities 220 in some manner. For example, the compute entities 220 in a compute node may be physically attached to a same baseboard or plane card in a chassis. In an embodiment, the compute entities 220 may share common resources, such as a power supply, a CPU or set of CPUs that manage operations of the compute entities 220, or even memory or storage resources.

For instance, a compute node 210 might be an AI server system, such as without limitation a Nvidia DGX series system. The system may comprising four, eight, sixteen, or even greater numbers of GPUs, with each GPU being a different compute entity 220. In another embodiment, a compute node 210 may be a server rack of GPUs or GPU systems. In another embodiment, a compute entity 220 may be a virtualized device, such that a single GPU (or other processing hardware) may appear as multiple compute entities 220, each executing a distinct compute process 230.

Each compute entity 220 in a compute node 210 implements one or more compute processes 230. A compute process 230 is an implementation of logic for performing certain tasks of one or more distributed applications, such as training (or re-training) different neural network models, running different simulations, and so forth. For instance, the compute process 230 may implement training logic 130 of FIG. 1, though in other embodiments, other types of compute processes 230 may be performed. For simplification, the examples herein typically mention only a single compute process 230 being implemented by a compute entity 220 for a single distributed application. However, it will be recognized that in some embodiments, a compute entity 220 may actually implement multiple compute processes 230 for multiple distributed applications concurrently.

Each compute entity 220 may perform a compute process 230 in parallel with compute processes 230 performed at other compute entities 220 in the system 200. A group of compute processes 230 working together to execute a distributed application may be referred to as a compute worker set. The compute entities 220 performing these processes 230 may be characterized as "compute workers" that are in, or belong to, the compute worker set. In some embodiments, there is a one-to-one mapping between distributed applications and worker sets. In other embodiments, a distributed application may include multiple worker sets performing different sets of tasks. Not all compute entities 220 connected to a compute-enabled switch 250, or even in a single compute node 210, need participate in the same distributed application. For instance, different subsets of compute entities 220 in a compute node 210, or different compute nodes 210, may train different neural network models concurrently. While only two compute nodes 210 are depicted, system 200 may include any number of compute nodes 210, each comprising any number of compute entities 220.

Logic implemented by a compute entity 220 in the course of executing a compute process 230 may be referred to herein as "worker logic" (e.g. training logic 130). Depending on the system and/or implemented tasks, the worker logic may be programmable (e.g., a software-based program of instructions executed by central processor units, graphics processor units, etc.), or the worker logic may be hard-coded logic performed by special-purpose hardware. In some embodiments, some or all of the worker logic within a distributed application are instances of the same logic, while in other embodiments, different compute entities 220 may implement different worker logic for the same application.

Each compute entity 220 is mapped to at least one specific port 240 within its corresponding compute node 210. Each port 240 is a communication interface, such as an Ethernet port, InfiniB and port, Fibre Channel port, etc. The compute entity 220 may be on the same chip as the underlying hardware for the communication interface, connected to the port 240 via direct wiring, or in some cases indirectly coupled to the port 240 via a shared bus or other mechanism. In an embodiment, there is a one-to-one mapping or one-to-many mapping from compute entities 220 to ports 240, such that each port 240 can only be used by the compute entity 220 to which the port 240 is mapped. A compute process 230 may send and receive data units, including those containing gradients or other vector data, via the port or ports 240 mapped to the compute entity 220 that is executing the compute process 230.

Each port 240 may be connected to a port 290 of the compute-enabled switch 250 via cabling or any other suitable mechanism. Although direct connections between ports 240 and 290 may be desirable in certain embodiments for reduced latency and/or other reasons, ports 240 may also be connected to ports 290 indirectly, via an intermediate, non-compute enabled switch or other network device.

When performing a compute process 230, a compute entity 220 may generate output data that needs to be reduced or otherwise utilized in conjunction with output data generated by other compute entities 220 in the same worker set. The output data of a compute entity 220 may be referred to herein as a vector, of which local gradient data 105 is an example.

A compute entity 220 may send this vector to the compute-enabled switch 250 via a port 240 that is mapped to the compute entity 220. Upon receiving the vector at the corresponding one of its ports 290, the switch 250 may forward the vector to a network compute process 270 executed by a network compute entity 260.

The switch 250, or more specifically the compute subsystem of the switch 250, may comprise one or more network compute entities 260 configured to perform collective operations on vector data that the switch 250 receives. Like compute entities 120/220, each network compute entity 260 may be a CPU, GPU, TPU, accelerator, or any other hardware capable of performing collective operations. In an embodiment, a network compute entity 260 may be a specialized compute engine, such as described in the aforementioned "Network Switch with Integrated Compute Subsystem for Distributed Artificial Intelligence and Other Applications."

A network compute entity 260 may execute any number of network compute processes 270. Each distributed application being executed by the network may have its own set of one or more network compute processes 270. For instance, if compute processes 230*a-h* are all part of a single machine learning task, there may be a specific set of one or more network compute processes 270 configured to collect vector data from the compute processes 230*a-h* and perform collective operations on the collected vector data. The collective operation may include, for instance, a reduction operation such as summation, multiplication, average, maximum, minimum, and so forth, a scan operation, a broadcast operation, a scatter operation, a gather operation, a barrier operation, or any other suitable action. A network compute process 270 may send results of a collective operation—e.g. result gradients—back to each compute process 230 in the distributed application via the corresponding ports 290/240.

Different applications and/or worker sets may require different collective operations. In some embodiments, compute entities 220 may send compute instructions to the compute-enabled switch 250. Compute instructions may identify the specific reduction operations or other collective operations for the network compute processes 270 to perform on particular vector data sets. Instructions may further specify data type(s) for specific vector data elements or other information related to data structure. In other embodiments, the network compute process 270 may be configured to discern the compute operation(s) to perform directly from the vector data and/or metadata associated with the vector data.

The compute-enabled switch 250 may include one or more buffer memories 280 for storing vector data until a network compute process is ready to process it. For example, a network compute process 270 may be unable to perform a collective operation in a certain epoch until it has received vector data from each compute process 230 involved in a certain distributed application. It may therefore store each vector data unit it receives in a buffer 280 until all compute processes 230 have sent vector data for that epoch. Or, the network compute process 270 may utilize a buffer 280 known as a processing buffer to store an intermediate "running" result, such as a running sum, of the vector data it has already received for the epoch, while waiting for additional vector data for that epoch. In some cases, vector data may arrive more quickly than it can be processed, and hence stored in a staging buffer 280 until a corresponding network compute process 270 can process it. Moreover, a processing buffer 280 may be utilized to store intermediate and/or final results of the collective operations until the switch 250 is ready to send those results. The buffer 280 may or may not be shared with packet-switching logic, depending on the embodiment.

2.3. Intra-Node Reduction and Vector Partitioning

In some embodiments, compute-node-based systems such as system 200 may realize certain benefits by performing an in-node reduction of local vectors prior to sending vector data to the network compute node. The compute processes produce local vectors, as explained above, but take advantage of an intra-node communication mechanism to aggregate or otherwise reduce the local vectors together at the node level, thereby producing an intermediate result referred to herein as a node vector. The compute nodes then need only send their node vectors to the network compute node, reducing network utilization between the compute nodes and the network compute node. The node vectors from each compute node may then be aggregated or otherwise reduced at the network compute node to produce a result vector.

In some embodiments, compute-node-based systems such as system 200 may also or instead realize certain benefits through vector partitioning. Vectors may be partitioned into partitions referred to herein as chunks. The partitioning scheme for each vector in the distributed application is the same, meaning that the first chunk of each vector contains values for a same first set of elements, the second chunk of each vector contains values for a same second set of elements, and so forth. In an embodiment, a compute node may be configured to partition the local vectors, or the node vector, into chunks prior to transmission to the network compute node, and then send each chunk to the network compute node via a different communication interface. The network compute node may similarly return the result vector as chunks via the different communication interfaces, thereby reducing the amount of time necessary to transmit the vectors.

Chunks of the local vectors generated by each compute process are referred to as local chunks. Chunks of node vectors that are aggregated or otherwise reduced at the node-level are referred to as node chunks. The chunks of the result vector that is returned to each compute process (e.g. the result gradient used for the backward pass of machine learning logic) are referred to as result chunks. Logically, all chunks that contain values for the same set of vector elements may be said to belong to a chunk grouping referred to herein as a chunk column.

Figure 3:
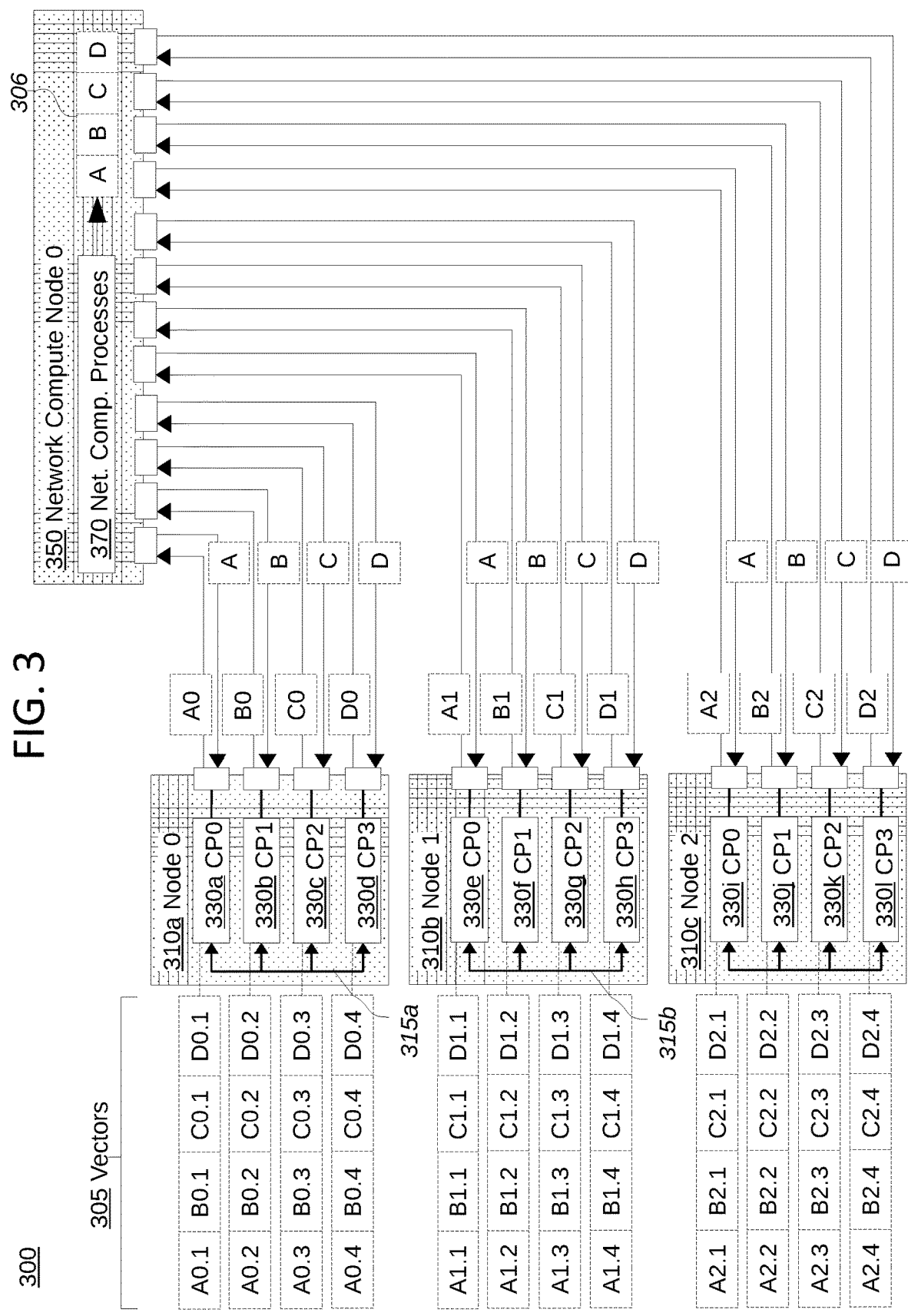
FIG. 3 illustrates an example distributed machine learning system that supports intra-node reduction and/or vector partitioning to reduce network bandwidth consumption.

FIG. 3 illustrates an example distributed machine learning system 300 that supports intra-node reduction and/or vector partitioning to reduce network bandwidth consumption, according to an embodiment. System 300 is in many ways similar to systems 100 and 200. For example, system 300 includes compute nodes 310 similar to compute nodes 210. Each compute node 310 includes a number of compute entities similar to compute entities 220, though these compute entities are not illustrated for simplification. Each compute entity executes a compute process 330, similar to a compute process 230. Like compute processes 230, each compute process 330 is mapped to a port (not labeled) by which it is coupled to a port (again unlabeled) of network compute node 350. Network compute node 350, meanwhile, is an example of a compute-enabled switch 250. Network compute node 350 includes one or more undepicted compute entities which execute network compute processes 370, similar to network compute processes 270.

However, the compute entities of each node 310, and hence the compute processes 330 executed at that node 310, are each coupled to each other via an intra-node communication mechanism 315, and therefore capable of intra-node communication. The communication mechanism may be, for instance, a bus or other interconnect. Or, the compute entities may be connected in a ring or other topology (e.g. to two adjacent entities).

The compute processes 330 may be configured to leverage intra-node communication in several manners. First, the compute processes 330 may divide the local vectors 305 they generate into chunks. Each compute process 330 generates a local vector 305 in the normal manner. However, after the compute process generates a local vector 305, it divides the local vector into a series of chunks. For example, compute process 330*a* may divide its vector into chunks A0.1, B0.1, C0.1, and D0.1, where each chunk comprises values for a different subset of vector elements in vector 305. Each compute process 330*a* should divide its vector up in the same manner, so as to produce the same number of chunks as each other compute process 330 in the same distributed application.

Moreover, like-numbered chunks in the series should include values for the same subset of elements. For instance, suppose chunk A0.1 includes vector elements 1-99, chunk B0.1 includes vector elements 100-149, chunk C0.1 includes vector elements 150-199, and chunk D0.1 includes vector elements 200-400. Compute process 330*b* would thus be expected to include its vector elements 1-99 in its chunk A0.2, vector elements 100-149 in chunk B0.2, vector elements 150-199 in chunk C0.2, and vector elements 200-400 in chunk D0.2. Conceptually, like-numbered chunks in each local vector (that is, chunks having the same set of vector elements) may be said to be in the same chunk column. Hence, in FIG. 3, each local vector 305 has a chunk for each of columns A, B, C, and D.

The compute processes 330 at a node 310 utilize the intra-node communication mechanism 315 to share the local vectors 305 they generate, or specific chunks thereof, with each other. The compute processes 330 may perform a local reduction or other collective operation(s) associated with the relevant distributed application on the local vectors. In an embodiment, each compute process 330 assumes responsibility for performing local collective operation(s) on a different chunk column. The compute process 330 then sends the resulting chunk of the collective operation—referred to as a "node chunk"—out over its associated port to the network compute node 350.

For example, compute process 330*a* may be assigned to reduce the first chunk in each local vector 305 to produce a node chunk A0. Similarly, compute process 330*b* may be responsible for generating a node chunk B0 from the second chunk in each local vector 305, compute process 330*c* may generate a node chunk C0 from the third chunk in each local vector 305, and compute process 330*c* may generate a node chunk D0 from the last chunk in each local vector 305. A compute process 330 need only receive the local vector chunks it is responsible for over the interconnect 315, but may optionally receive other chunks or even all of the local vectors 305 generated in the node 310.

Alternatively, the node 310 may include other compute entities configured to perform local collective operations, or a single compute entity that performs the local collective operation for all local vectors, which may then return at least the relevant node chunks to compute processes 330 responsible for sending those chunks.

In either case, in each node 310, there will be one compute process assigned to each chunk column (that is, to each set of chunks that contains the same vector elements). As depicted in FIG. 3, each compute process 330 is given a label, and this label indicates the chunk column to which the compute process 330 is assigned. For example, compute processes 330*a*, 330*e*, and 330*i* are each assigned within their respective nodes 310 to the chunk column "A", and hence share the label CP0.

Note that, as illustrated in FIG. 3, the number of chunks into which each vector 305 is divided is the same as the number of compute processes 330 (and hence compute entities) executed by each node 310. This need not always be the case, but the number of chunks in a vector 305 should be at least as great as the minimum number of compute processes 330 executed in each node 310 for the relevant distributed application, so that there may a compute process responsible 330 for each chunk column in each node 310. This may be two, four, eight, sixteen, or any other suitable number of chunks, depending on the embodiment and application configuration.

A network compute process 370 may perform a collective operation between node chunks in the same chunk column. For instance, the network compute process 370 may receive node chunk A0 from compute process 330*a*, node chunk A1 from compute process 330*e* of node 310*b*, and node chunk A2 from compute process 330*i* of node 310*c*. Based on metadata associated with these node chunks, and/or the ports over which these node chunks were received, the network compute process 370 may determine that each of these node chunks includes values for the same set of vector elements, and therefore perform a collective operation between the node chunks to generate a result chunk A. The network compute process may send the result of the collective operation back to each compute process 330 that sent a node chunk based upon which the result was calculated. For instance, the network compute process 370 may return the result chunk A back to each of compute processes 330*a*, 330*e*, and 330*i*.

In some embodiments, there may be a separate network compute process 370 for each chunk into which a vector 305 may be divided. For instance, one network compute process 370 may generate the result chunk A from node chunks A0-A2, another network compute process 370 may generate the result chunk B from node chunks B0-B2, and so forth. These network compute processes 370 may be, for instance, tied to specific ports of the network compute node 350 over which the corresponding node chunks would be received, and be assigned different buffers, network compute entities, and/or other resources. On the other hand, a single network compute process 370, network compute entity, and buffer may be utilized for all of the chunks in other embodiments.

In an embodiment, the set of all result chunks generated by the network compute node 350 forms a result vector 306 that may be utilized by the compute processes 330 to adjust parameters for a next epoch. However, the network compute node 350 need not necessarily (but may) send the entire vector 306 to each compute process 330, or even ever merge the result chunks to form vector 306. Rather, upon receiving a result chunk, a compute process 330 may use the intra-node communication mechanism 315 to share the result chunk with each other compute process 330 at the same node 310, thereby allowing each compute process 330 to form the result vector 306.

In system 300, there is no longer any need to send all of the local vectors 305 to network compute node 350, but rather only a single node vector for each node 310, thereby significantly reducing the amount of network bandwidth utilized. Moreover, since each compute process 330 may share the burden of sending the node vector and receiving the result vector, the capacity of the network resources of each compute node 310 and the network compute node 350 may be more optimally utilized.

Note that the depicted number of nodes 310, ports, chunks, and compute processes 330 is merely illustrative. There may be greater numbers of nodes 310, ports, chunks, and so forth, depending on the embodiment.

2.4. Hierarchical In-Network Compute

For some distributed applications, it may be desirable to utilize more than one compute-enabled switch. For example, if the number of compute processes exceed the number of available ports on a compute-enabled switch, it may be desirable to use additional compute-enabled switches so that each compute process may be directly connected to a compute-enabled switch. However, as the number of compute-enabled switches rise, a number of issues of scale may result.

Figure 4:
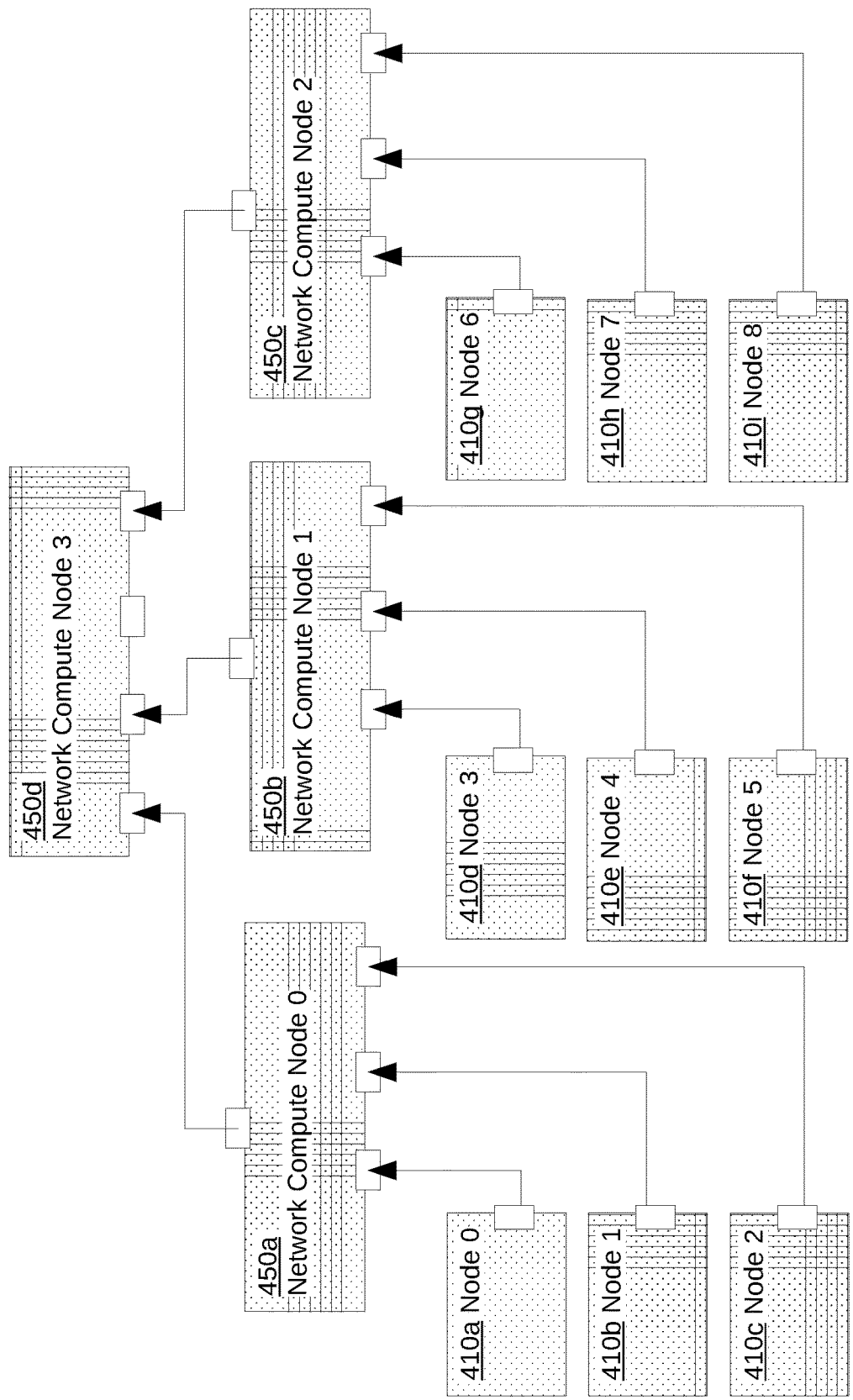
FIG. 4 illustrates a distributed machine learning system comprising four network compute nodes in a hierarchical arrangement.

For example, FIG. 4 illustrates a distributed machine learning system comprising four network compute nodes 450 in a hierarchical arrangement, according to an embodiment. Each of network compute nodes 450a-450c are coupled to three different compute nodes 410. Each compute node 410 may execute any number of compute processes, and each network compute node 410 may include a separate port for each of these compute processes. For instance, each compute node may execute eight compute processes, and each network compute node 450 may therefore be at least a twenty-four-port switch. However, for simplification, separate compute processes and ports for each compute node 410 are not depicted.

In order to generate a final result vector for the compute processes at nodes 410, a network compute node 450a-c would need access to all node (or local) vectors sent by the nodes 410 for the relevant epoch. This would require network compute nodes 450a-c to be linked to each other, either directly or through another switch, so as to share this information with each other. Unfortunately, this increases the resource requirements at each network compute node 450a-c, as each must devote additional buffer resources to buffering intermediate results for each chunk column for a potentially longer period of time. Moreover, each network compute node must devote resources to performing compute operations on different chunk data sets, which may require frequent context switching, reprogramming of a compute entity for each chunk data set, and other relatively expensive operations.

The redundancy and increased buffering requirements at network compute nodes 450a-c may, in some embodiments, be alleviated somewhat by employing a compute hierarchy, where each network compute node 450a-c sends its intermediate results to a network compute node 450d. Network compute node 450d may then generate the result vector, and return it to network compute nodes 450a-c. However, this solution comes at the expense of additional switches in the hierarchy, which can grow to multiple levels as the number of compute processes increase to hundreds or even thousands.

2.5. Node Multi-Switch Connection Architecture

Figure 5:
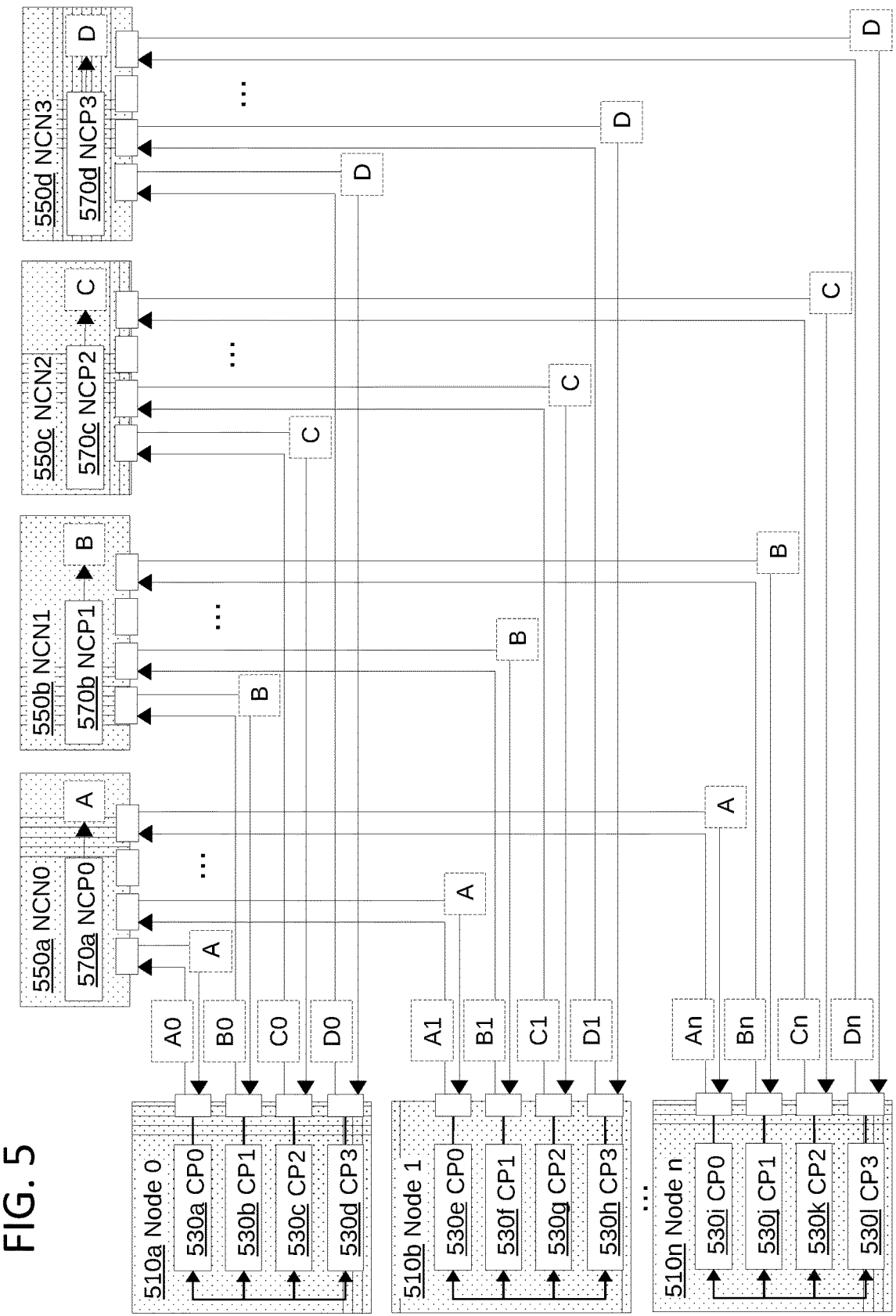
FIG. 5 illustrates a distributed learning system in which each compute node is connected to multiple compute-enabled switches.

FIG. 5 illustrates a distributed learning system 500 in which each compute node 510 is connected to multiple compute-enabled switches 550, according to an embodiment. System 500 is in many ways similar to system 300. Nodes 510, for example, may be similar to nodes 310, in that they both include multiple compute entities. The compute entities of node 510 execute compute processes 530, which are similar to compute processes 330. More specifically, compute processes 530 generate local vectors in the same manner that compute processes 330 generate local vectors 305. Those vectors are, like vectors 350, divided into chunks, and each compute process 530 is assigned responsibility for a different column of the chunks. Vector data is shared between the compute processes 530 in a node 510 via an intra-node communication mechanism, as in system 300.

However, unlike in system 300, system 500 includes multiple network compute nodes 550a-d. Rather than a node 510 being connected entirely or predominately to a single network compute node 550, each compute process 530 of each node 510 is coupled to a different network compute node 550. For example, compute process 530a may be wired directly (or otherwise connected) to a port on network compute node 550a, compute process 530b may be wired directly (or otherwise connected) to a port on network compute node 550b, compute process 530c may be wired directly (or otherwise connected) to a port on network compute node 550c, and compute process 530d may be wired directly (or otherwise connected) to a port on network compute node 550d. As a result, each network compute node 550 is connected to each compute node 510 that participates in the distributed learning system 500.

The connections between compute nodes 510 and network compute nodes 550 are arranged such that each network compute node 550 receives and processes vector data for a different chunk column. For example, network compute node 550a is coupled to compute processes 530a, 530e, and 530i, which only send the network compute node 550a vector data for chunk column A. Meanwhile, network compute nodes 550b, 550c, and 550d only receive and process vector data for chunk columns B, C, and D, respectively. Note that the number of chunk columns in a vector is the same as the number of network compute nodes 550.

As in system 300, each compute process 550a may perform a local collective operation to produce a node chunk to send to the corresponding network compute node 550a. For instance, compute process 530a may send node chunk A0 to network compute node 550a, compute process 530e may send node chunk A1 to network compute node 550a, and compute process 530n may send node chunk A1 to network compute node 550a. However, in some embodiments, a compute process 530 may simply send all local vector chunks for its chunk column directly to the network compute node 550a, rather than performing a local collective operation.

Each network compute node 550 comprises a network compute entity that implements a network compute process 570. As would a network compute process 370, network compute process 570 performs a collective operation between each chunk it receives for a given chunk column in a given epoch for a given application. Likewise, the network compute process 570 returns a result vector chunk to each compute process 530 that it is coupled to. For instance, network compute node 550a returns a result chunk A to compute processes 530a, 530e, and 530i. The compute processes 530 then share the result chunks they receive with each other compute process 530 in their respective nodes 510 via the intra-node communication mechanism.

None of the network compute nodes 550 need to receive or process a full vector, or even be aware that other vector chunk columns exist. Consequently, the network compute nodes 550 need not reserve buffer space or devote processing resources to reduce chunks from non-assigned chunk columns. For instance, whereas network compute node 350 would need a separate processing buffer to store an intermediate result for each column of a result vector, the network compute nodes 550 each need a processing buffer for only one column of the result vector. Moreover, the network compute processing logic demands on any given network compute node 550a may be fewer than those on a network compute node 350, since network compute processes 570 at a given network compute node 550a need only be configured to operate on a single chunk column for any given distributed application. This may reduce the need for context switching and reconfiguration between different collective operations for different chunk columns, and/or reduce the demand for a staging buffer to store vector data that is awaiting processing. Moreover, a staging buffer may support a greater number of outstanding data elements for processing due to the fact that there is only a single column being processed in a particular network compute node. As a result, the resource requirements to provide in-network compute at any given network compute node 550 may be greatly reduced.

Moreover, all other aspects of systems 300 and 500 being equal (e.g., number of ports per compute node and network compute node), system 500 may scale better than system 300. System 300 requires additional network compute nodes once the total number of compute processes 330 exceed the number of ports at network compute node 330, and these additional network compute nodes come at the expense of network bandwidth and other resources to support communication of vector data between the network compute nodes, as illustrated in FIG. 4. Given that distributed learning tasks may involve hundreds, thousands, or even more compute processes 530, the ports in even very large compute-enabled switches may quickly become exhausted. By contrast, even though additional network compute nodes may be required in system 500, the expense of communicating vector data between network compute nodes 550 is altogether avoided until the number of compute nodes 510 exceeds the number of ports available at any given network compute node 550 (which may, in some embodiments, number in the hundreds or even more).

FIG. 5 illustrates but one example of a system with a node-to-multi-switch architecture. Other such systems may include additional or fewer elements, in varying arrangements. For example, the number of compute nodes 510, compute processes 530 per compute node 510, network compute nodes 550, ports per network compute nodes 550, and chunk columns per vector may vary, and depending on the embodiment.

Moreover, network compute nodes 510 may feature additional compute processes executed by other compute entities that are not involved in the same distributed application as compute processes 530. These compute processes may or may not be connected to some or all of network compute nodes 550. Similarly, network compute nodes 550 may be connected to other devices than compute nodes 510, and these devices need not be involved in the same distributed application, or indeed any distributed application. The network compute nodes 550 may simply be configured to treat traffic from these other devices as standard network traffic, and provide packet-switching function for that traffic.

In other embodiments, additional devices connected to network compute nodes 550 and/or additional compute processes at nodes 510 connected to network compute nodes 550, may be involved in other distributed applications. Some or all of network compute nodes 550 may implement network compute processes for these other distributed applications, potentially using some or all of the same buffer and/or processing resources. For instance, a network compute entity may be scheduled to switch between collective operations of different distributed applications based on the availability of vector data for those distributed applications, priority levels, and/or other considerations. The set of network compute nodes involved in one distributed application may partially or fully overlap with the set of network compute nodes involved in another distributed application.

In an embodiment, a network compute node may be connected to more than one compute process at each compute node 510, and therefore perform collective operations for more than one chunk. All compute processes 530 responsible for chunks in the same column would still connect to the same network compute node 550, which would be responsible for computing a result chunk for that column. For instance, instead of four network compute nodes 550, there may be two network compute nodes 550. Network compute node 550a might be connected, via different ports, to the compute processes 530 labeled CP0 and CP1, and return result chunks A and B to those compute processes 530, respectively. Meanwhile, network compute node 550b might be connected, via different ports, to the compute processes 530 labeled CP2 and CP3, and return result chunks C and D to those compute processes 530 respectively.

In an embodiment, a network compute node may be configurable to operate in a multiple chunk mode, as with network compute node 330, or a single chunk mode, as with network compute nodes 530, and/or in a hybrid mode, as explained in the previous paragraph. In some embodiments, the mode in which a network compute node operates may be a function of which vector chunks it receives and/or which nodes it is connected to (as discernable from metadata or instructions received in association with the vector data). In other embodiments, an orchestrator node configures a network compute node in the proper mode using suitable compute instructions.

2.6. Compute Planes

As suggested above, a system using the node-to-multi-switch architecture may eventually exhaust the number of ports available at each of the network compute nodes 550. In these and other situations, an architectural construct referred to as a compute plane may be utilized to scale to even greater numbers of compute nodes.

Figure 6:
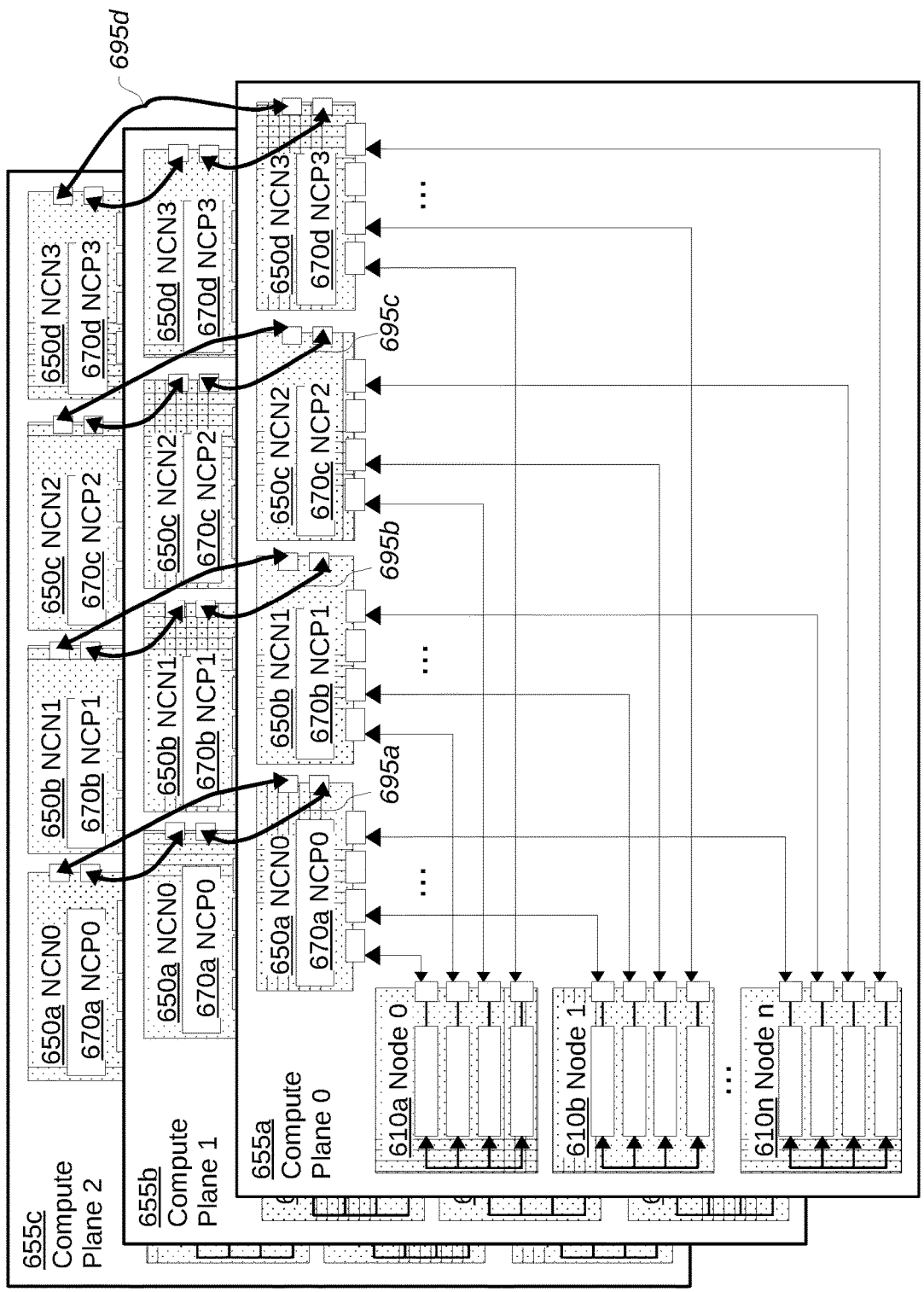
FIG. 6 illustrates an example distributed learning system for a distributed application that utilizes compute planes.

FIG. 6 illustrates an example distributed learning system 600 for a distributed application that utilizes compute planes 655a-c, according to an embodiment. Each compute plane 655 includes its own set of compute nodes 610 and network compute nodes 650, which is arranged within the plane in similar manner to the compute nodes 510 and network compute nodes 550 of system 500. All of these compute nodes 610 and network compute nodes 650 are configured to generate and operate on vector data for the same distributed application.

The compute nodes 610 and network compute nodes 650 in a given plane operate within that plane 655 in the same manner as compute nodes 510 and network compute nodes 550 operate within system 500, with the exception that the network compute processes 670 from each plane 695 must communicate with counterpart network compute processes 670 in each of the other planes 655 via an inter-plane communication mechanism 695 to exchange intermediate result data prior to calculating the final result chunks. For each chunk column, there will be a separate network compute node 650 in each compute plane 655, and these network compute nodes may each be linked via an inter-plane communication mechanism 695 to enable reduction of a result chunk for that chunk column.

For instance, the network compute process 670a in plane 655a may generate an intermediate result chunk Aa, also referred to as a plane chunk Aa, from the vector data it receives from the compute nodes 610 in plane 655a. Similarly, the network compute process 670a in compute plane 655b might generate a plane chunk Ab, and the network compute process 670a in compute plane 655c might generate a plane chunk Ac. The network compute processes 670a may then utilize inter-plane communication mechanism 695a to share plane chunks Aa, Ab, and Ac, so as to enable calculation of the result chunk A that is to be returned to each compute node 610 in their respective planes 655.

The network compute nodes 650b use inter-plane communication mechanism 695c to generate the final result chunk B, the network compute nodes 650c use inter-plane communication mechanism 695c to generate the final result chunk C, and the network compute nodes 650d use inter-plane communication mechanism 695d to generate the final result chunk D. Since the different final result vector chunks need not be combined to form the result vector until they arrive back at the compute nodes 610, the inter-plane communication mechanisms 695 connecting each set of network communication nodes 650a, 650b, 650c, and 650d may be separate and distinct.

The inter-plane communication mechanisms 695 may each be any suitable communication mechanism. For example, the planes 655 may be linked by one or more central hubs, where an available port at each network compute node 650 is connected to a hub. There may be a separate central hub that connects the network compute nodes 650 for each chunk column (e.g. a first hub connecting network compute nodes 650a, a second hub connecting network compute nodes 650b, and so forth). Or, a single hub may connect all network nodes 650.

A central hub may broadcast each of the plane chunks it receives to the responsible network compute nodes 655 in each of the other planes 655. For instance, a central hub might share a plane chunk Aa computed by network compute node 650a in compute plane 655a with each of the other network compute nodes 650a in compute planes 655b and 655c. The network compute nodes 650 may then each calculate the final result vector chunk themselves. Or, a central hub may itself comprise a compute subsystem configured to compute a final result chunk and return it to each of the planes 655. For instance, a central hub may compute a final result chunk A from the plane chunks it receives from all of the network compute nodes 650a, and return this back to each of the network compute nodes 650a.

As another example, the planes 655 may be linked using a ring topology, where each plane 655 is linked to two adjacent planes 655. That is, the planes 655 are organized such that each plane is adjacent to exactly two other planes in a ring formation. Each network compute node 650 may have one port linked to a network compute node 650 in one adjacent plane, and another port linked to a network compute node 650 in another adjacent planes.

In an embodiment, with such a mechanism, an All-Reduce strategy may be used to share data. For instance, a first network node 650 may pass its plane chunk on to the corresponding network node 650 in the next plane 655. That network compute node 650 may reduce the plane chunk it receives with its own plane chunk. That network compute node 650 may then pass this intermediate result on to the next plane 655, which reduces it with its plane chunk, and so forth. A final result chunk will eventually be generated by the last network compute node 650 in the ring to process the vector data, and the final result chunk may then be propagated back through the ring. Of course, any other strategy for sharing vector data between the compute planes 655 may be utilized.

FIG. 6 illustrates but one example arrangement of compute planes. Other systems may include additional or fewer elements in varying arrangements. For instance, there may be additional compute planes, or additional compute nodes and/or network compute nodes per compute plane. Any other suitable topology may be utilized for inter-node communication mechanisms 695, including more complex hierarchical topologies. Moreover, the topology within each compute plane 655 may vary—for instance, a ring topology might be used in one compute plane, while a full mesh topology might be used in another. Regardless of the topology within a plane, the planes would still be connected using an inter-plane communication mechanism, as in FIG. 6.

2.7. Sub-Partitioning

Figure 7:
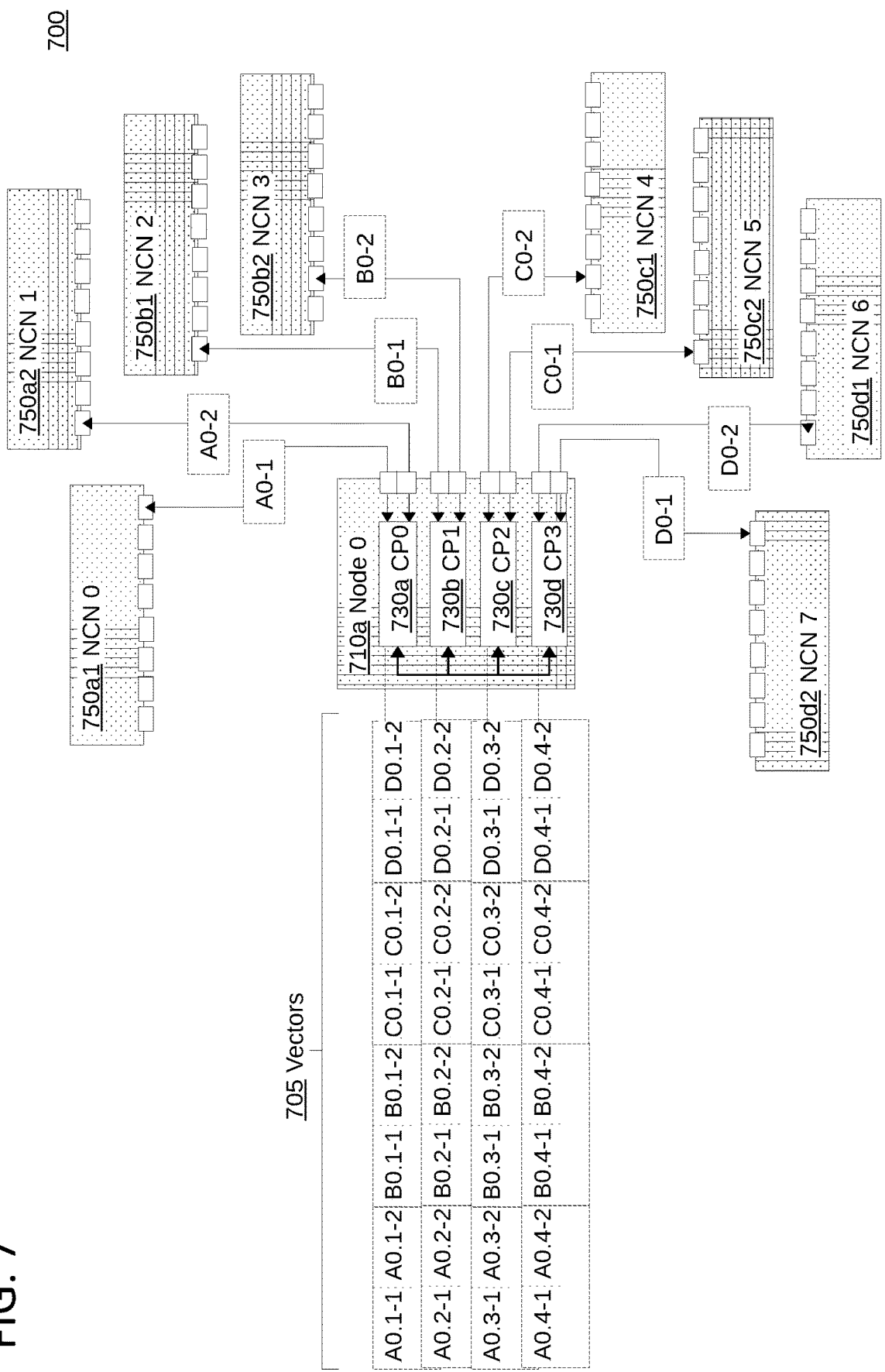
FIG. 7 illustrates a distributed learning system in which a compute process is configured to divide a chunk into multiple sub-chunks that can be sent to the network compute node separately via different ports.

FIG. 7 illustrates a distributed learning system 700 in which a compute process 730 is configured to divide a chunk into multiple sub-chunks that can be sent to a network compute node separately via different ports, according to an embodiment. The compute processes 730 at a compute node generate vectors 705, which are partitioned into chunks, as in the previous examples. Each compute process 730 is also assigned responsibility for a different chunk column, as explained in the previous examples.

However, before a compute process 730 sends a chunk, whether it be a local chunk or a node chunk reduced from the local chunks that the compute process is responsible for, the compute process 730 divides the chunk into two or more sub-chunks. For example, compute process 730a may reduce a node chunk A0 from local chunks A0.1, A0.2, A0.3, and A0.4. Compute process 730a may divide the node chunk A0 into sub-chunks A0-1 and A0-2. Of course, compute process 730a could also have divided each local chunk prior to the local reduction operation and then reduced the sub-chunks separately.

The compute process 730 then sends each sub-chunk to a different network compute node 750. For example, compute process 730a sends sub-chunk A0-1 to network compute node 750a1 and sub-chunk A0-2 to network compute node 750a2. In an embodiment, each compute process 730 may be coupled to or assigned two or more network communication interfaces, each of which may be connected to a different network compute node 750, and the sub-chunks may thus be sent out different ones of these network communication interfaces.

Each network compute node 750 may perform collective operations to reduce the sub-chunks it receives in the same manner as it reduces full-size chunks, as described elsewhere herein. In fact, in an embodiment, the network compute nodes 750 need not even be aware that they are performing a collective operation on a sub-chunk as opposed to a chunk (or even an entire vector). Note that, although only one compute node 710 is depicted, each network compute node 750 would in fact be connected to and receive sub-chunks from a potentially much greater number of compute nodes 710. Network compute nodes 750 return the result chunks they reduce back to the compute processes 730 to which they are connected via the corresponding network communication interfaces.

While FIG. 7 illustrates only two sub-chunks per chunk, other embodiments may have three, four, or even greater numbers of sub-chunks per chunk. Note that both the number of network compute nodes 750 to which each compute node 710 is connected as well as the number of communication interfaces needed at each compute node 710 increase by a factor of the number of sub-partitions for each chunk.

In an embodiment, each compute entity that implements a compute process 730 may be coupled to a SerDes or other communication hardware that a systems integrator may configure as a single high-bandwidth network interface, or as a greater number of network interfaces at lower speeds. For example, the communication hardware may support a single 400 Gb/s Ethernet port, two 200 Gb/s Ethernet ports, four 100 Gb/s Ethernet ports and so forth. The configuration used for a given distributed computing system may vary based on the needs of the system. In some implementations, for instance, it may be desirable to have a smaller number of network communication interfaces, but with a high-bandwidth connection to each network compute node 750. Hence, the SerDes may be configured as a single port, and vector chunks will not be sub-partitioned. In other implementations, it may be desirable to have a large number of network compute nodes 750 working in parallel, and a low bandwidth connection to each of the network compute node 750 may be satisfactory. Hence, the SerDes may be configured as, for instance, four ports, and vector chunks may be sub-partitioned into four sub-chunks.

In yet another embodiment, a single physical port may be subdivided into channels dedicated to different chunk columns. A network compute node may, for instance, have different compute entities or processes assigned to handle chunks or sub-chunks communicated over these different channels.

3.0. Functional Overview

Described in this section are various example method flows for implementing various features of the systems and system components described herein. The example method flows are non-exhaustive. Alternative method flows and flows for implementing other features will be apparent from the disclosure.

The various elements of the process flows described below may be performed in a variety of systems, including in the distributed computing systems described in previous sections and/or in other distributed systems. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. System-Level Flow

Figure 8:
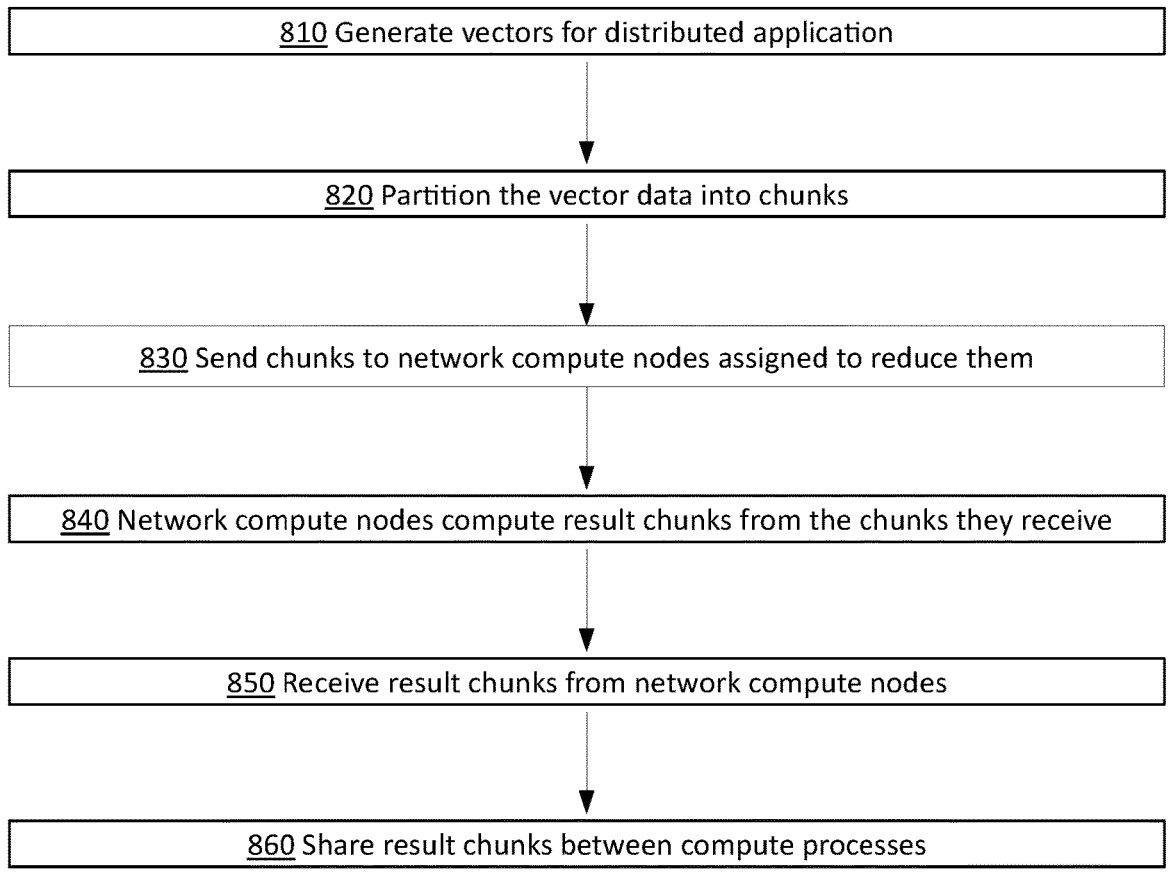
FIG. 8 illustrates a system-level flow for distributed compute operations in a network.

FIG. 8 illustrates a system-level flow 800 for distributed compute operations in a network, according to an embodiment.

Block 810 comprises generating vector data for a distributed application by executing a plurality of compute processes at a plurality of compute entities in a plurality of compute nodes. There may be any number of compute nodes, each executing the same number of compute processes for the distributed application. The compute nodes and compute processes may be any suitable compute nodes described herein, including without limitation compute nodes 510 and compute processes 530, respectively.

The distributed application may be any type of computing application, though in certain embodiments the distributed application is a distributed machine learning application, such as described elsewhere herein. The vector data may include a plurality of local vectors generated for the distributed application for any suitable purpose. Each vector comprises a plurality of values. Each of the values is for a different vector element in a set of vector elements that is common to all vectors generated for the distributed application. Each local vector is generated by a different one of the compute processes, as also described elsewhere herein. For instance, each local vector may be a gradient generated by a different one of the compute processes during a forward pass of a neural network, comprising a separate gradient element for each of a plurality of weights or other parameters.

Block 820 comprises partitioning the vector data into chunks. In some embodiments, the local vectors may be partitioned into chunks directly. Optionally, depending on the embodiment, the chunks of the local vectors generated within a given node may then be reduced together to form node chunks for that node. In other embodiments, the local vectors generated by the compute processes within a given compute node may first be reduced to a node vector for that compute node, and the node vector may then be partitioned.

In either event, the partitioning mechanism used to divide the local vectors or node vectors into chunks is the same for each vector. The partitioning mechanism ensures that, for each vector, there will be one chunk for each of a plurality of defined subsets of vector elements, as described elsewhere herein.

Block 830 comprises sending each chunk of the chunks to a corresponding network compute node that has been assigned to reduce the subset of vector elements within the chunk. There may be a plurality of network compute nodes, such as network compute nodes 550, each of which is responsible for reducing vector data for a different subset of the vector elements. In some embodiments, only chunks of node vectors are sent to the network compute nodes. In other embodiments, local vectors may not necessarily be reduced into node vectors, and hence chunks of local vectors are sent to the network compute nodes. In either case, there will be a plurality of chunks for each vector that is sent to the network compute nodes, and each of these chunks will be sent to a different one of the network compute nodes.

In an embodiment, the connections between the compute nodes and the network compute nodes are arranged such that each of the compute nodes has a connection to each of the network compute nodes (e.g. as in system 500). In this case, each compute node may be configured to associate the different connections with different subsets of vector elements (e.g. different chunk columns). Each compute node is configured to communicate chunk data via the connection that is associated with the subset of vector elements that correspond to the values within the chunk data. From another perspective, each compute node has a dedicated connection to each network compute node for sending chunk data that comprises values for the subset of vector elements assigned to that network compute node.

In yet other embodiments, certain advantages may still be realized without each compute node having a direct connection to each network compute node. Rather, a compute node may send chunks to some or all of the network compute nodes via a single interface to an intermediary switch or other network device.

Block 840 comprises, at each network compute node, computing a result chunk based on the chunks sent to that network compute node. Each network compute node may, for instance, be configured to collect all chunks that carry data for a certain subset of vector elements in a buffer. When it has received a chunk from each of the compute nodes, the network compute node may perform one or more collective operations associated with the distributed application (e.g. summation, product, average, etc.) to reduce the chunks into a single result chunk that has a single reduced value for each of the vector elements. A network compute node may also reduce chunks together as they are received if resources permit.

Block 850 comprises the network compute nodes returning the result chunks they generated back to each compute node. A network compute node may return the result chunk it generated back to each of the compute nodes via, for instance, the same connections that the compute nodes used to send chunks to the network compute node.

Block 860 comprises, at each compute node, sharing each result chunk with each compute process in the node. Any suitable intra-node communication mechanism may be utilized to facilitate the sharing, as described elsewhere herein. As a result of the sharing, each compute process with have a complete result vector, consisting of each result chunk that the network compute nodes generated. In other words, each compute process will have a result vector with a result value for each vector element in the local vector that the compute process originally generated. The compute process may utilize this result vector for any suitable purpose, including without limitation a backward pass of a neural network being trained by the compute process, or any other parameter adjustment for a next iteration of a learning or other computing task. Flow 800 may optionally be repeated for each of a plurality of such iterations.

Flow 800 illustrates but one example flow for distributed compute operations. Other such flows may include fewer or additional elements in varying arrangements. For example, in an embodiment, the compute nodes and network compute nodes may form a compute plane, as in system 600. There may a plurality of other compute planes that separately perform flow 800 with respect to their own compute nodes and network compute nodes. In each iteration, the result chunk of block 840 may be treated as an intermediate result chunk, or plane chunk. Flow 800 may be expanded to include steps for sharing plane chunks between the network compute nodes of each plane prior to computing a final result chunk at each network compute node. Flow 800 may then resume with block 850 for returning the final result chunk to each compute node in each plane.

In an embodiment, a compute node need not be restricted to sending a network compute node only the chunk that the network compute node will reduce, but may in fact send up to the entire vector to each network compute node. The network compute node must then be configured to select the appropriate chunk of the vector to reduce.

In another embodiment, a compute node may be configured to send chunks from multiple chunk columns to the same network compute node. The network compute node may be responsible for reducing each of these chunk columns, and includes logic for differentiating between chunks associated with different subsets of vector elements. For each subset of vector elements that the network compute node is responsible for reducing, the network compute node should identify and reduce all chunks that carry values for that subset. The result chunk for each of these subsets of vector elements may then be returned to each compute node.

In an embodiment, in compute architectures such as described herein, compute nodes may rely upon network compute nodes for collective operations other than reduction, using steps similar to those of blocks 830-860. Such collective operations may or may not involve each compute node sending data to the network compute node, but may nonetheless involve some or all of the compute processes receiving data back from the network compute node via the network links and intra-node communication mechanisms.

For instance, in a broadcast operation, the network compute node may receive data (e.g. a chunk) from a particular compute process, and then broadcast that data to each of the compute processes to which it is connected (and, optionally, other compute planes). The connected compute processes may share the data with each compute process at their respective compute nodes, depending on the operation. The network compute node may similarly perform a scatter operation, but send different portions of the data it receives to different compute processes.

As another example, each compute process may send a message to the network compute node that subscribes to a synchronization or other barrier operation. Upon receiving the message from each connected compute process (and optionally, each other compute plane), the network compute node may broadcast a barrier message to each connected compute process (and optionally, to each other compute plane) indicating that the compute processes may proceed. Each connected compute process may share the barrier message with the other compute processes at their respective compute nodes.

As yet another example, the network compute node may collect data from each connected compute process for a gather operation, and send that data to a single connected process (either in the same plane, or via a different compute plane). The network compute node may perform yet other collective operations as well, as mentioned in other sections.

3.2. Compute Process Flow

Figure 9:
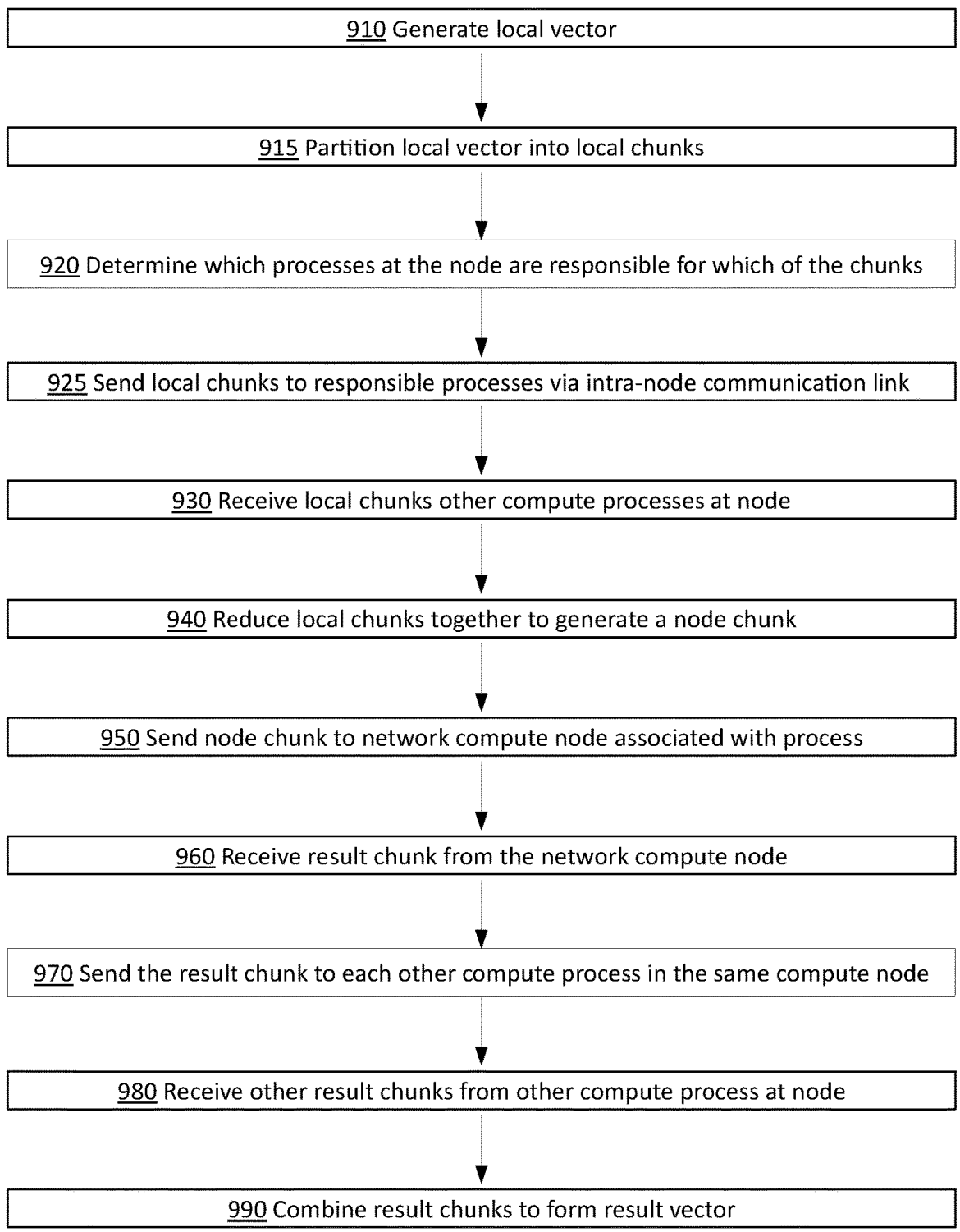
FIG. 9 illustrates a flow for distributing and receiving vector chunks at a particular compute process.

FIG. 9 illustrates a flow 900 for distributing and receiving vector chunks at a particular compute process, according to an embodiment. The particular compute process is an implementation of instructions for a task of a distributed application, such as, without limitation training logic or other machine learning logic. The particular compute process may be, for example, implemented by a compute entity at a compute node, such as by a GPU, CPU, TPU, or other accelerator. In an embodiment, for instance, the compute process may be a compute process 530. In other embodiments, however, flow 900 may be practiced in systems other than system 500 and need not include the specific details of system 500. Conversely, a compute process 530 may implement flows other than flow 900.

Block 910 comprises the particular compute process generating a local vector. The vector comprises a value for each element in a series of vector elements. The particular compute process is one of many compute processes that are participating in a distributed application by generating vectors that comprise values for the series of vector elements. This set of compute processes is collectively referred to as a worker set. The worker set includes a set of other participating compute processes at the same compute node as the compute process, as well as equally-sized sets of participating compute processes at other compute nodes. The particular compute process may generate the values of the vector as a result of any suitable logic. For instance, in an embodiment, the values may be gradient values as described elsewhere herein.

Block 915 comprises partitioning the local vector into chunks. The particular compute process does so in accordance with a common partitioning scheme employed by each compute process that is generating vectors for the series of vector elements. The partitioning scheme may divide the series of vector elements into a number of subsets. The number of subsets may be equal to the number of compute processes within the computing node that are participating in the worker set. In some embodiments, the subsets may be divided in such a manner that they are substantially equal in the number of vector elements within each subset, or substantially equally in the amount of space needed to store values for each subset. In other embodiments, the partitioning scheme may divide the vector elements in any other suitable manner, such as by relations between vector elements, predefined element groupings, and so forth, so long as the manner is consistent across all computing processes in the worker set.

The local vector itself is divided into chunks, also referred to as local chunks. Each local chunk comprises the local vector's values for a different one of the subsets of vector elements.

Block 920 comprises determining which of the participating compute processes are responsible for which of the chunks generated in block 915. Each compute process in the worker set is assigned responsibility for a different set of vector chunks. More specifically, each participating compute process within a compute node is assigned to a different one of the subsets of vector elements—or chunk column. Each participating compute process is responsible for all vector chunks generated within its compute node that comprise values for the assigned subset of vector elements. The particular compute process may determine the mapping between compute processes and vector element subsets in any suitable manner, such as process configuration data, instructions to the compute process, a mapping of compute entity hardware identifiers to the subsets, etc, so long as each compute process within the compute node determines the same mapping.

For instance, each subset of vector elements may be identified by a number indicating the order of the subset within the series of vector elements within each vector. Each compute entity may have a hardware identifier, worker set identifier, or other suitable identifier. The compute process whose compute entity had an identifier of 0 might be assigned to the first subset of vector elements, and so forth. In an embodiment, such a mapping may have been determined in advance, and need not be determined again each time the compute process executes flow 900.

Block 925 comprises the particular compute process sending each local chunk not assigned to the compute process to the compute process within the same compute node that is responsible for that chunk, as indicated by the mapping determined in block 920. The particular compute process will send a different local chunk to each participating compute process in the compute node. The particular compute process retains the local chunk that the particular compute process is responsible for.

The particular compute process sends the local chunks via an intra-node communication mechanism. This mechanism may comprise, for example, a shared addressable bus, separate connections between each compute entity in the node, and/or a switching mechanism. In an embodiment, the mechanism may include connections between adjacent compute entities, as well as logic at each compute entity for relaying data not addressed to the compute entity on to another adjacent compute entity, thereby forming a ring or other suitable topology.

Block 930 comprises the particular compute process receiving local chunks from other compute processes in the compute node. The particular compute process receives a plurality local chunks that carry values for the subset of vector elements assigned to the particular compute process. The particular compute process receives one of these local chunks from each participating compute process in the compute node. These local chunks are received via the intra-node communication mechanism.

Block 940 comprises the particular compute process reducing the local chunks together to generate a node chunk. The reduction may involve any suitable collective operation(s) dictated by the distributed application, such as summation, averaging, products, and so forth. The operation should be the same at all participating compute nodes. The node chunk has an intermediate result value for each vector element in the subset of vector elements assigned to the particular compute process. In an embodiment, different collective operations may be performed for different vector elements.

Block 950 comprises sending the node chunk to a network compute node associated with the compute process, which is assigned to reduce the chunk. The network compute node may be a compute-enabled switching device, including without limitation a network compute node 550 or other network compute node described herein. The network compute node should execute a network compute process configured to reduce vectors that comprise the same subset of vector elements as was assigned to the particular compute process.

In an embodiment, the compute entity executing the particular compute process is directly coupled to the network compute node. For instance, the compute entity may be hard-wired to a communication interface that is in turn connected by cabling directly to an Ethernet port of the network compute node. In another embodiment, the compute process may be configured to send the node chunk to the network compute node by addressing the node chunk to the network compute node and sending the node chunk to an internal or external forwarding mechanism.

Block 960 comprises receiving a result chunk from the network compute node. The result chunk should contain a result value for each vector element in the subset of vector elements assigned to the particular compute process. In an embodiment, the network compute node may have generated the result chunk by reducing the node chunk from the particular compute process with node chunks it received from compute processes that were assigned responsibility for the same subset of vector elements at other compute nodes. In an embodiment, the result chunk may have been generated also based on reduction operations with plane chunks from other compute planes. In any event, the network compute node should be configured to reduce vector chunks by performing the same collective operation(s) as the particular compute process performed in block 940. An example process flow for the network compute node is described subsequently.

Block 970 comprises the particular compute process sending the result chunk to each of the other participating compute process in the same compute node. The particular compute process may broadcast or otherwise send the result chunk via the intra-node communication mechanism.

Block 980 comprises receiving other result chunks from the other participating compute processes at the compute node. These compute processes may have received these result chunks from different network compute nodes responsible for reducing different subsets of the vector elements, as a result of each participating compute process also performing flow 900 in parallel with the particular compute process. The particular compute process receives a result chunk from each participating compute process at the node, comprising result values for the subset of vector elements assigned to that compute process.

Block 990 comprises combining the result chunk received in block 960 with the result chunks received in block 980 to form a result vector. Between these result chunks, the particular compute process will have received a result chunk for each different subset of the vector elements, and thereby has a result value for each element of the vector. The particular compute process may utilize the result vector for any suitable purpose, including without limitation making adjustments for block 910 in a next iteration of the particular compute process, as described elsewhere herein.

Flow 900 illustrates one example flow for a compute process. Other flows may include fewer or additional elements in varying arrangements. For instance, in some iterations, some or all of blocks 930-970 may be performed concurrently with or even after block 980. As another example, some or all of blocks 915-930 may be performed concurrently with block 910.

As suggested above, flow 900 may be performed by many compute processes in parallel at the same and different compute nodes. Each compute process may generate local vectors from different data and/or parameters. These compute processes may repeat flow 900 in each of a plurality of different epochs.

In an embodiment, instead of sending a single node chunk and receiving a single result chunk in return, the particular compute process may sub-partition the node chunk, or the individual local chunks, and send different sub-chunks to different network compute nodes, which then return corresponding result sub-chunks, as depicted in FIG. 7.

In an embodiment, the particular compute process may skip block 920 and simply broadcast or otherwise send the entire local vector to all compute processes at the compute node. Likewise, the particular compute process may receive each local vector generated by each compute process in the compute node. Each participating compute process may then be responsible for partitioning the local vector and extracting the chunk that the compute process is responsible for.

In an embodiment, the particular compute process need not perform a local reduction operation in block 940, but may instead send each local chunk to the network compute node.

In an embodiment, the particular compute node may send an entire node vector, or even each local vector, to the network compute node, which is then configured to extract the chunk(s) that it is responsible for reducing.

3.3. Network Compute Node Flow

Figure 10:
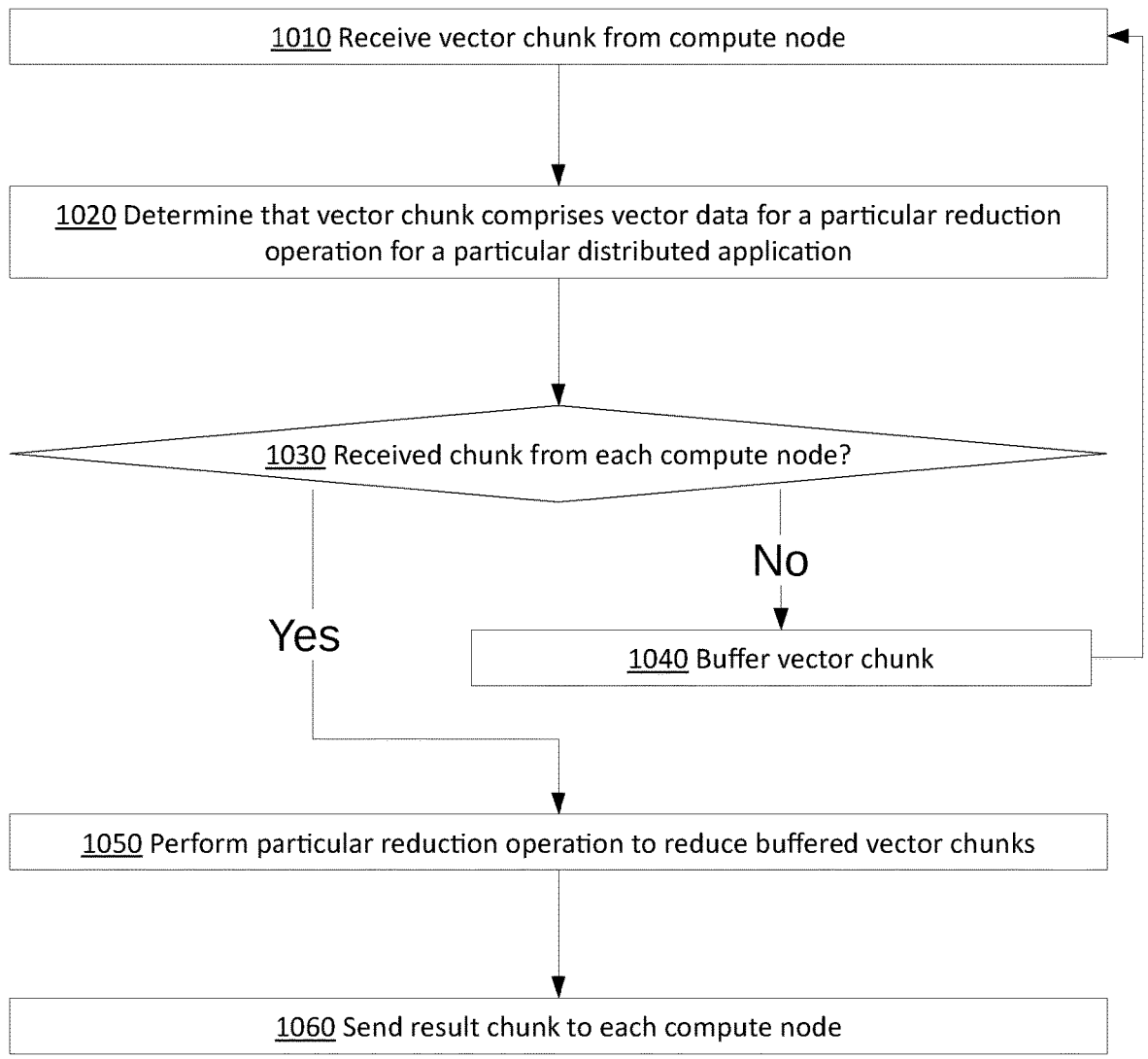
FIG. 10 illustrates a flow for generating result chunks at a network compute node.

FIG. 10 illustrates a flow 1000 for generating result chunks at a network compute node, according to an embodiment. Flow 1000 may be implemented by any type of network compute node, including without limitation network compute node 550 of system 500. In an embodiment, a network compute node that has received a node chunk per block 950 of flow 900 may utilize flow 1000 to generate a result chunk to return in block 960. However, flow 1000 may also be utilized in other contexts without the specific details system 500 and/or flow 900. Moreover, flow 900 and system 500 need not necessarily be practice with the specific details of flow 1000.

Block 1010 comprises receiving a vector chunk from a compute node. The vector chunk may be a local chunk or node chunk, as described elsewhere herein, comprising a plurality of values for a plurality of vector elements. The vector chunk may be received in one or more data units, depending on the size of the vector chunk. In some embodiments, data from the vector chunk may need to be buffered until the entire vector chunk has been received and assembled, at which point it can be processed.

In an embodiment, vector data is but one type of data that the network compute node may receive. Block 1010 may thus be proceeded by steps such as determining that data units received by the network node carry data for a vector chunk as opposed to non-vector data, forwarding that data to a network compute process within the network compute node, and so forth.

Block 1020 comprises determining that the vector chunk comprises vector data for a particular reduction operation for a particular distributed application. This may comprise identifying a distributed application for which the vector chunk was generated. This may also or instead comprise determining that the chunk comprises values for a particular set of vector elements (e.g. a vector column). The specific vector elements for which the vector chunk contains values need not be known. Rather, it is sufficient that the network compute node is able to determine that the chunk contains values for, for instance, the second subset of vector elements in a series of vector elements being generated for the distributed application.

In some embodiments, the distributed application and/or relevant subset of vector elements may be implicit from a context in which the vector chunk was received. For instance, the network compute node may be configured to automatically reduce all chunks received over a certain set of ports in a certain time frame together. In other embodiments, the distributed application and/or relevant subset may be indicated by one or more identifiers received in metadata associated with the vector chunk, such as a field in a data unit header. Such identifiers may include a source identifier, application identifier, worker set identifier, context identifier, column identifier, data set identifier, and so forth. For example, the network compute node may previously have received a compute instruction that indicates that all chunks received with a particular application identifier, data set identifier, and epoch identifier should be reduced together.

Block 1030 comprises determining whether the network compute node has received a vector chunk from each compute node connected to the network compute node that is involved in the reduction operation. For instance, the network compute node may have been pre-configured to expect to receive a node chunk from each of a plurality of compute nodes participating in the distributed application. In an embodiment, the vector chunks considered for block 1030 should be only those generated during a certain iteration, or epoch, of the distributed application for the specific subset of vector elements that the vector chunk received in block 1010 carries values for. If compute nodes are not configured for local reduction, block 1030 may entail ensuring that the network compute node has received each local vector chunk from each compute process at each compute node.

If in block 1030 it is determined that the network compute node has not received a vector chunk from each compute node, flow 1000 proceeds to block 1040, in which the vector chunk is placed in a buffer with other associated vector chunks. Flow 1000 then returns to block 1010 for the receipt of additional vector chunks.

Otherwise, flow 1000 proceeds to block 1050. Block 1050 comprises the network compute node, or more specifically a network compute process at the network compute node, reducing the vector chunk with other buffered vector chunks for the same subset of vector elements. The specific collective operation(s) to be performed (e.g. sum, average, product, etc.) may be indicated in configuration data for the relevant distributed application. During the collective operation, a single result value is calculated for each vector element in the subset of vector elements based on each chunk's value for the same vector element. The result values together constitute a result chunk.

Block 1060 comprises the network compute node sending the result chunk to each compute node that it received one of the vector chunks from.

Flow 1000 illustrates one example flow for a network compute node. Other flows may involve additional or fewer elements in varying arrangements. For instance, in an embodiment, there may be multiple compute planes, each with a network compute node assigned to reduce the same set of vector elements. The result chunk generated in block 1050 may be considered a plane chunk. Flow 1000 may then include additional steps of sharing plane chunks amongst the different network compute nodes and reducing the plane chunks together to form a final result chunk (either at each network compute node separately, in coordination via an All-Reduce or other strategy, or at a central hub). The final result chunk may then be returned in block 1060.

As another example, in an embodiment, rather than waiting until all vector chunks have been received to perform the collective operation(s), a network compute node may begin performing certain collective operations on vector chunks as the vector chunks are received. For example, the network compute node may compute a sum for each value of each vector chunk that has been received so far, and then store the result as an intermediate result in the buffer in 1040 rather than storing each vector chunk separately. When the final vector chunk has been received, it may be reduced with the intermediate result to produce the result chunk.

In some embodiments, processing resources may permit an "in-memory" reduction, where an intermediate result is determined as soon as a vector chunk is received, and only the intermediate result needs to be written to the buffer. In other embodiments, the network compute node may be configured to generate intermediate results for certain buffered vector chunks when processing resources are available, and may thus at any given time store both an intermediate/working result as well as unprocessed vector chunks in the buffer.

In an embodiment, due to buffer and/or processing constraints, multiple intermediate results may be generated and stored in place of different sets of vector chunks and the result chunk may be determined at least in part by reducing the multiple intermediate results.

In an embodiment, there may be different collective operations for different vector elements associated with the distributed application, and block 1050 may comprise resolving the collective operation to perform based on context identifiers, data set identifiers, or other metadata associated with the vector chunks.

4.0. Example Implementation Details

4.1. Error Handling

A variety of error conditions may affect the operations of a distributed computing system. One type of error is packet corruption, wherein the data units (e.g. packets) that carry vector data or compute instructions may become corrupt as the representative signals traverse the network and/or are written to and read from buffers. Packet corruption errors may include, for example, CRC errors, malformed packets, and so forth. These errors may require that the sending compute process retransmit the corrupted data unit(s), or even that other compute processes retransmit other packets related to those corrupted data unit(s). This, in turn, may require that the various compute processes and network compute processes pause or delay further operations until the required data units have been retransmitted.

According to an embodiment, a system configured such as in system 500 may reduce the likelihood of such errors by reducing the amount of data transmitted over the network, as well as the lengths of the paths that the data must travel, since each compute process is directly connected to each network compute node. Even in the compute plane embodiment of system 600, the amount of network communication is greatly reduced compared to other alternatives, thereby reducing the likelihood of packet corruption.

Another type of error is buffer overflow. The memories in which a switch or other network device may temporarily buffer vector data and/or the data units used to transmit that vector data (e.g. ingress buffers, egress buffers, packet buffers, processing buffers, etc.) are finite in size. Under certain conditions, these memories, or at least the portions allocated to a certain application or task, may become too full. Any new data arriving for that certain application or task may be dropped, again requiring retransmission of the containing data units as well as potentially other data units whose data may be flushed from the buffer in the interim.

According to an embodiment, a system configured such as in system 500 may again reduce the likelihood of such errors. Not only does the intra-node communication reduce the amount of data transmitted to the network compute nodes, and thereby reduce buffering requirements, but the amount of room required in the buffers is also reduced, particularly if an intermediate result is continually calculated as the vector chunks are received.

Another type of error is a collective operation failure. A collective operation may fail, for instance, if vector data expected for the collective operation never arrives, if an unsupported operation is requested, if there is underflow or overflow of a particular value being calculated, and so forth. Such failures require a reaction from the compute processes to report or rectify the error, or even to prevent the error from occurring in the future.

According to an embodiment, a system such as system 500 simplifies and accelerates the reporting of these and other errors. Since all compute nodes are directly connected to the network compute node, the network compute node may easily and quickly report the error back to the compute nodes, which may then share information about the error between its compute processes. Similarly, information about such errors may be disseminated rapidly to all compute nodes in system 600 on account of the inter-plane communication mechanism, using either a dedicated inter-plane messaging protocol or piggybacking on other inter-plane messages by inserting error information into headers.

Moreover, in hierarchies such as in system 400, certain switches may not be compute-enabled, and thus lack logic for recognizing compute-related errors and conveying them properly to the compute processes. Systems 500 and 600 may be utilized to reduce or eliminate the need for non-compute-enabled switches, and thus eliminate this problem.

4.2. Vector Data

As explained elsewhere herein, a vector is a set of values. Each value is said to correspond to a different element, which may be a defined field, or may simply be an ordinal position of the value within the vector, depending on the embodiment. Each element may have its own data type (e.g., integer, float, Boolean, serialized structure, etc.). It will be understood that, in some embodiments, the values within the vector may actually correspond to those of higher-rank tensors or complex data structures, and certain collective operations may interpret them as such.

The term vector data, as used herein, refers to data from one or more vectors, whether that data include entire vectors or just chunks thereof.

Any two vectors that have values for the same set of vector elements are said to be of the same vector type, and may be reduced together. A set of vectors of the same type that are intended to be reduced together are referred to as a vector data set. Similarly, any two vector chunks that have values for the same vector elements are said to be of the same chunk type, or "in" the same chunk column, and may be reduced together. A set of chunks of the same type that are intended to be reduced together are referred to as a chunk data set.

Compute entities may send and receive vector data to a compute-enabled switch in any suitable form. In an embodiment, the compute entity may send a vector or chunk in one or more data units, such as in the payload of Internet Protocol (IP) packets, cells, InfiniBand Messages, or any other suitable data unit. Data units that carry vector data or instructions may be referred to as "compute data units," or more specifically "gradient data units" if carrying gradient data. An identifier within a data unit header, or at a designated place in the payload, may indicate that a data unit is a vector data unit. Moreover, compute data units may include any of the afore-mentioned identifiers. Such identifiers may be placed in a header (e.g., a packet header), or directly in the data unit payload. In an embodiment, the vector data may be sent in InfiniBand, RDMA, or similar messages comprising a plurality of packets.

In an embodiment, gradient or other vector data sent to or from compute nodes may be organized into distinct containers. A container of vector data may comprise any number of values for any number of vector elements. A container may include an entire vector, an entire vector chunk, or any portion thereof. A container may further include, or be associated with, various metadata that indicates where and/or how the vector data should be processed.

For example, in an embodiment, the metadata may include a global application identifier that uniquely identifies the distributed application for which the vector data was generated. In an embodiment, the metadata may include a worker set identifier that identifies a worker set associated with the vector data, and/or a worker identifier that identifies the specific compute entity or process that generated the vector data. The metadata may further specify, in some embodiments, an operation type, a data type, or other configuration data. The metadata associated may further include an epoch identifier that identifies the epoch in which it was generated.

In an embodiment, the metadata may include a container set identifier that identifies a container set to which the container belongs. In an embodiment, each container in a container data set has the same implicit arrangement of vector data elements, such that each set's first vector data element may be summed or otherwise reduced with each other, each set's second vector data element may be summed or otherwise reduced with each other, and so forth. In other embodiments, the organization of a vector data unit may instead be specified explicitly. For instance, vector data elements may be tagged or otherwise labeled, and each set may include a mapping that assigns labels to specific vector data elements in the set. Each vector data element in a container data set with the same label may then be reduced together. In some embodiments, for compression or other reasons, not all containers in a container data set need include an explicit value for each vector data element in the container data set. Omitted vector data elements may be assumed to have a default value (e.g. 0).

In an embodiment, the metadata may include a transaction identifier that identifies a transaction to which the container belongs. Containers within the same transaction may have similar processing attributes, such as being associated with a same collective action or set of collective actions, and so forth. In an embodiment, each container data set generated by a worker set for a given application during a given epoch is assigned the same transaction identifier. In other embodiments, a transaction identifier may be used to group container data sets together in contexts that lack the notion of epochs.

In an embodiment, the metadata may include a variety of other elements, such as a batch identifier that indicates a specific batch of data that was processed to generate the vector data, a timestamp that indicates when the vector data was generated, a transaction length that specifies a length of the transaction (e.g., a number of container data sets, data units, bytes, etc.), an operation identifier that indicates the collective action that is to be performed on the container data set to which a container belongs, data type identifier(s) of vector data elements in the container, entity status information, and so forth.

In an embodiment, a compute process may divide a container amongst a number of compute data units (e.g., packets, frames, cells, etc.) for transmission purposes. In an embodiment, the compute process may be configured to do so in a manner that is consistent across compute entities, such that each entity transmits its values for the same vector data elements in the same fields or bits of its compute data units as each of the other compute entities. For instance, each compute entity might be configured to ensure that the fifth value in the third data unit it transmits for a given vector data set always corresponds to the fiftieth gradient element. Alternatively, each compute data unit may include or reference a mapping that indicates which portion of a compute data unit corresponds to which vector data element. In some such embodiments, certain collective operations may optionally be performed across compute data units having the same vector elements, thereby avoiding the need to reassemble the entire container.

4.3. Compute Instructions

In an embodiment, a compute entity, orchestrator node, or other network entity may send compute instructions to a compute-enabled switch to specify reduction operations or other collective operations to perform on various vector data sets, chunk data sets, transactions, collections of containers, or other data. Specified collective operations may include, without limitation, aggregation, summation, product, maximum, minimum, broadcast, scatter, gather, scan, reduce-and-scan, barrier, and combinations thereof.

In an embodiment, an instruction may be embedded within the data for which it is being issued directly, such as in the header or at the start of the payload of a compute data unit. Or, the instruction may be issued separately, and instead specify the chunk(s), vector(s), or container(s) with which the instruction is associated using one or more identifiers, such as a container data set identifier, application identifier, transaction identifier, epoch identifier, etc. For instance, a compute entity may send a command to a switch to reduce a gradient from that compute entity together with all other gradients that the switch receives in association with a certain transaction or epoch.

According to an embodiment, the compute instructions may utilize a library that conforms to a common distributed system instruction standard, such as Message Passing Interface ("MPI") or NVIDIA Collective Communications Library ("NCCL"). Examples of these standards are described in, for instance, "MPI: A Message-Passing Interface Standard Version 3.1" by the Message Passing Interface Forum, dated Jun. 4, 2015, and "NVIDIA Collective Communication Library (NCCL): Developer Guide" by Nvidia Corporation, dated December 2017, both of which are hereby incorporated by reference for all purposes as if set forth in their entireties. For instance, in an embodiment, each compute entity is assigned a rank in an MPI or NCCL communicator grouping. The compute entities may thus send normal MPI or NCCL commands to a compute-enabled switch, including without limitation MPI_GATHER, MPI_REDUCE, MPI_SUM. In an embodiment, a compute-enabled switch or orchestrator node may act as the root process in the grouping. Depending on the embodiment, an implementing system may be fully or only partially compliant with such standards. Moreover, in some embodiments, the system may extend such standards to support a richer set of compute instructions. In an embodiment, the library transforms MPI, NCCL, or other standard commands into a standard format that may be used in a transport layer, involving sockets, verbs, and/or other constructs.

In an embodiment, a compute instruction may specify complex collective actions comprising multiple sub-actions that a network compute process should perform on the associated vector data, and the order in which the sub-actions are performed. For example, the compute instruction may specify that the values of a vector data element should be sorted, that the first five values and last five values should be dropped, and that a summation should then be computed. Such instructions enable complex statistical actions to be performed by applying multiple primitives to aggregated data, in a manner that would not be possible on compute entities without significant communications overhead.

In other embodiments, compute entities do not send explicit compute instructions to a compute-enabled switch. Instead, instructions may be inferred from context information. For example, the compute-enabled switch may be pre-configured to perform one or more specific collective actions with respect to the vector data it receives, based on mappings between instructions and identifiers or other attributes of the vector data. For instance, the compute-enabled switch may be pre-configured to perform an aggregation operation on all compute data units that have a combination of a specific worker set identifier and specific epoch identifier. In some embodiments, the compute-enabled switch may include some interface by which it may be pre-configured in this manner by, for instance, an orchestrating node.

Worker Sets

Worker sets may be established in any suitable manner. For instance, a compute-enabled switch or an orchestrating node may be configured to assign nodes to fixed worker sets, or to worker sets that are selected dynamically based on resource needs. In an embodiment, a worker set is established in the same manner as would a control or data plane in normal network configuration processes. In an embodiment, special compute configuration packets may be sent to a compute-enabled switch to provide group configuration instructions in advance of communicating any vector data. For instance, such instructions may establish a number or even specific set of compute nodes and/or processes that is to work on an application, how the switch is to communicate with each compute node, an application identifier, collective operations to be performed, vector data set organization schemes, and so forth. In an embodiment, an RDMA protocol may be used to establish InfiniBand or RoCE queue pairs construct (e.g. worker set identifier and a transaction identifier) that map to an application in advance. In an embodiment, within a group, a compute process may be bound (e.g., by the compute-enabled switch) to one or more worker identifiers, also referred to as "ranks."

4.4. Compute-Enabled Switches

In an embodiment, network compute nodes may be implemented using specialized hardware and/or software-based logic within otherwise conventional switches in a data center or other network. For instance, the network may be a typical fat-tree network consisting of compute nodes in server racks, where each compute node in the rack is connected to a top-of-rack ("TOR") switch. Multiple racks of compute nodes may be interconnected by having each TOR connected to an aggregation switch. Both types of switches may be modified so as to be a compute-enabled switch. In other embodiments, other configurations may be utilized.

In an embodiment, an implementing switch may be a multiport network bridge that uses hardware addresses to process and forward data units at the data link layer ("layer 2") of the Open Systems Interconnection ("OSI") model 2, optionally with capabilities to process data at the network layer (layer 3). However, although the examples given throughout the disclosure often refer to embodiments in which switch is an Ethernet-based switch, and may have particular advantages in Ethernet-based networks, in yet other embodiments a compute-enabled switch may be adapted for other types of networks, such as InfiniBand, Fibre Channel, and so forth, and/or provide support for InfiniBand-based, RoCE, or other semantics within an Ethernet-based network.

Thus, unless otherwise mentioned or apparent, techniques described with respect to switch should be understood to be applicable to any computing device configured to receive and forward data units amongst a plurality of interconnected computing devices, regardless of the communication standard or protocol. This may include routers, gateways, and other network devices adapted to include packet-switching logic as described herein.

Extension Modules

In an embodiment, rather than requiring specialized hardware or logic to be directly integrated into a switch, a switch may be extended to support compute functionality using one or more compute extension modules. For example, one or more compute extension modules may be deployed in-line between a switch and one or more compute nodes. Each compute extension module intercepts vector data traveling to and/or from the switch, and processes that vector data with its own compute subsystem. Pass-through logic within the compute extension module allows other network traffic to pass through the compute extension module transparently, with minimal processing, if any.

As another example, instead of providing compute functionality using an inline compute extension module, the switch may rely on a sidecar compute extension module with an integrated compute subsystem. All interfaces of the sidecar module are connected directly to the switch, and the switch sends all vector data to the sidecar module via one of the connected interfaces. In some embodiments, the sidecar module may be assigned a network address, and compute nodes may be configured to send vector data to the sidecar module instead of the switch. In other embodiments, compute nodes send vector data directly to the switch, which is configured to forward any data units recognized as compute data units (e.g. using type information in the packet header) out one of the interfaces to which the compute extension module is connected.

Examples of these and other extension modules are described, without limitation, in the afore mentioned patent application, "Distributed Artificial Intelligence Extension Modules For Network Switches."

4.5. Compute Subsystem

According to an embodiment, network compute processes within a network compute node may be implemented by one or more compute subsystems.

Figure 11:
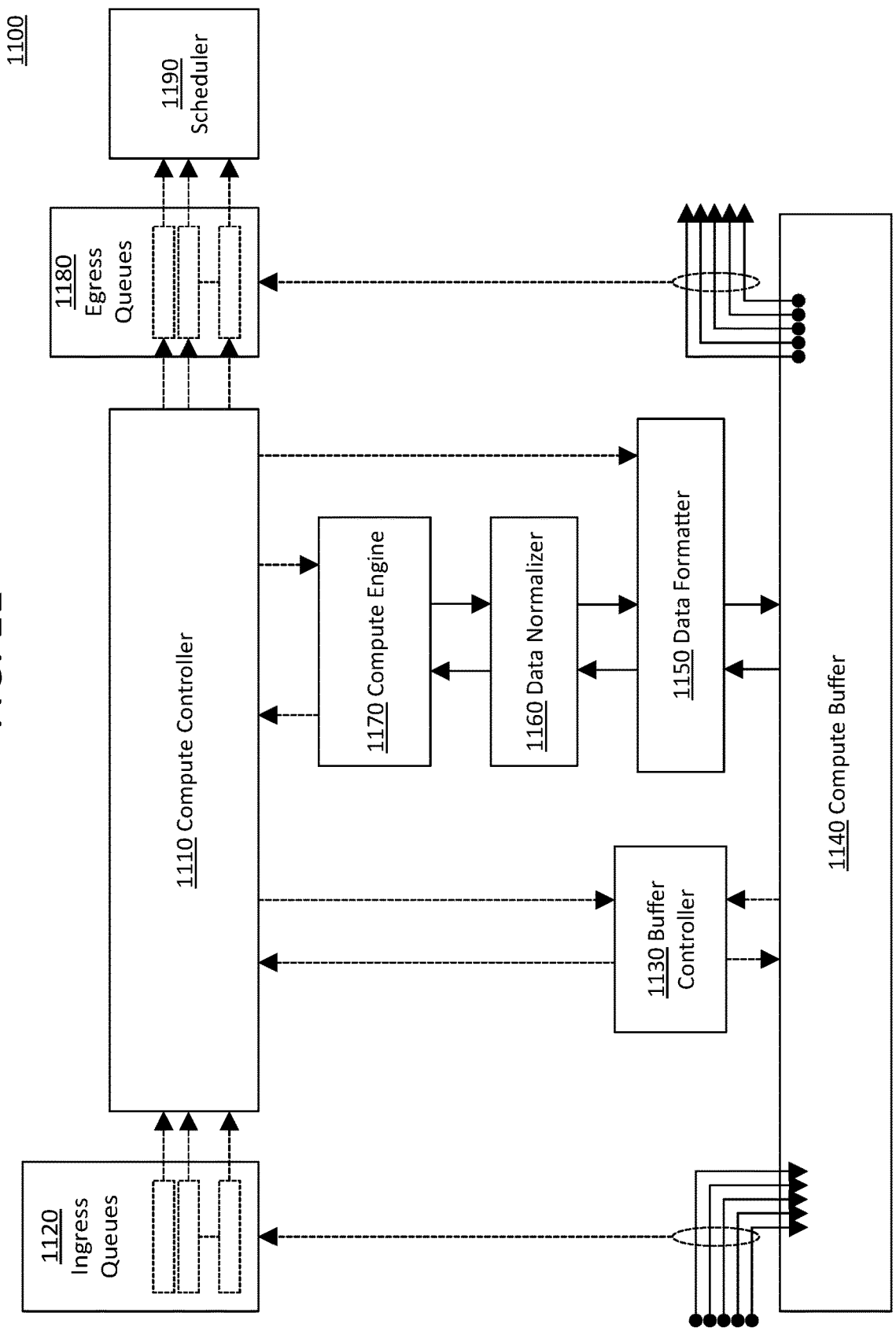
FIG. 11 illustrates an example compute subsystem.

FIG. 11 illustrates an example compute subsystem 1100, according to an embodiment. Subsystem 1100 comprises various components 1110-1190 implemented by hardware within a computing device. In FIG. 11, and in subsequent figures, arrows are utilized to illustrate possible flows of data and control information between components, with dashed lines indicating control information and solid lines illustrating actual data from data units. The arrows are given by way of example only, and the corresponding data and control flows are neither exhaustive nor necessarily required in all cases.

Buffer Memory

Compute subsystem 1100 comprises a compute buffer 1140 and buffer controller 1130. Compute buffer 1140 comprises one or more memories in any suitable form, such as a static random-access memory ("SRAM"). The compute buffer is divided into addressable units referred to herein as buffer entries, in which vector data may be stored. Each memory of the compute buffer may comprise one or more distinct buffer entries.

A buffer controller 1130 manages the use of the compute buffer 1140. As compute data units are received at the compute subsystem 1140, the buffer controller 1130 determines whether the compute data units can be buffered, and, if so, identifies suitable locations in which to store the compute data units. The buffer controller 1130 may further be responsible for determining where to store intermediate results and result data, as they are computed. In an embodiment, the buffer controller 1130 may further include scheduling logic for determining when to read and/or write vector data to the compute buffer 1140.

A compute data unit may be stored in one or more buffer entries, depending on the size of the data units and the chosen buffer entry size. In an embodiment, each buffer entry may store an entire compute data unit. In an embodiment, vector data is initially received at the switch as compute packets, but divided into cells for transmission and storage within the switch. Hence, each buffer entry may be configured to store a single compute cell. In an embodiment, vector data may be stripped from data units and stored in raw form.

There may be different types of compute buffers for different purposes, such as a packet buffer and processing buffer, as described elsewhere herein. The compute buffer may be shared with, or separate from, buffers used to packet normal network data units.

Processing Queues

Compute subsystem 1100 further comprises various processing queues for vector data, including ingress queues 1120 and egress queues 1180. There may be multiple ingress queues 1120 and multiple egress queues 1180, each having a different purpose, as described in other sections.

In an embodiment, queuing logic within a traffic manager or other component of the packet-switching logic may place compute data units in the appropriate ingress queue 1120 as the data units are received at the switch. In such an embodiment, the ingress queues 1120 may be part of a larger set of queues to which the queuing logic may assign a data unit, and the act of the queueing a data unit in the ingress queues 1120 constitutes, in essence, sending the data unit to the compute subsystem 1100.

Alternatively, compute subsystem 1100 comprises separate queueing logic for enqueuing vector data into the ingress queues 1120. For instance, upon receiving and buffering vector data in a buffer entry, buffer controller 1130 might pass a pointer to the buffer entry to queueing logic in compute controller 1110, or in any other suitable component. The buffer entry may store an entire compute data unit, or raw vector data or instruction(s), depending on the embodiment. The queueing logic may then determine the appropriate ingress queue 1120 in which to place the buffer entry, using techniques as described in other sections.

In an embodiment, ingress queues 1120 include one or more compute data queues and, separately, one or more compute instruction queues. In other embodiments, a queue may hold both vector data and compute instructions.

As with other queues, ingress queues 1120 may be represented using one or more link memories. Each queue node may be represented by an entry in the link memory. In an embodiment each link entry in an ingress queue 1120 may contain a data pointer to a buffer entry where corresponding vector data is stored. In an embodiment, if that vector data is not a full container, the link entry may further store a link pointer to the address of another link entry whose data pointer points to a next portion of the container, such that the entire container may be discovered by following a chain of entries in the link memory. For instance, a first link entry for a gradient might point to a first buffer entry that stores the first set of elements of gradient, as well as to a second link entry that points to a second buffer entry that stores the second set of elements of the gradient. The second link entry may in turn also point to a third link entry that points to a third buffer entry that stores the third set of elements of the gradient, and so forth. A link entry for a compute instruction may be similarly structured—it may include a data pointer to a buffer entry that stores the compute instruction (or it may include the compute instruction itself), as well as a link pointer to the buffer entry of the first portion of vector data to be processed in accordance to the compute instruction. Of course, other linking structures may also or instead be utilized for ingress queues 1120.

Egress queues 1180 operate on similar principles, but instead point to result data in the data buffers 1140 (e.g., aggregated gradients) that are ready for transmission back to compute nodes. As such data is generated and buffered, queueing logic in the compute controller 1110 or any other suitable component enqueues a pointer to that data by adding it to an appropriate egress queue 1180. In an embodiment, the result data may first be linked using a transmission context, until either a corresponding container data set or group of container data sets has completed, and can then be linked to an egress queue 1180.

Compute Engine

Compute subsystem 1100 further comprises a compute engine 1170 configured to perform collective operations. A compute engine 1170 comprises one or more compute entities. The compute engine is configured to input vector data (e.g., from the one or more buffer memories) and perform the actual compute operations on the inputted vector data. In some embodiments, the compute engine 1170 comprises hardware-based logics configured to perform each of the collective operations the compute subsystem 1100 supports. For instance, the compute engine may comprise specialized logics for computing summations, averages, products, minimum values, maximum values, median values, statistical operations, and so forth. The logic(s) used to process the inputs are dynamically programmable, depending on the inputted vector data.

In an embodiment, a compute array comprising a matrix or other arrangement of interconnected collective processing units may be utilized as a compute engine 1170. The collective processing units may be configured to perform a variety of primitive operations. The primitive operations may include, for example, summation, multiplication, bitwise operations (XOR, XNOR, shift left, shift right, etc.), logical operations (logical AND, logical Or, greater than, less than, etc.), voting operations, minimum, maximum, minloc, maxloc, a NOOP command, etc. Of course, other types of processing hardware may be utilized instead of a compute array.

Compute Controller

Compute subsystem 1100 further comprises a compute controller 1110. Compute controller 1110 coordinates the processing of compute instructions and the reading of vector data from the buffer 1140. In some embodiments, compute controller 1110 may further include logic for communicating with compute nodes with respect to flow control, synchronization, and other issues.

In an embodiment, ingress queues 1120 may indicate an order for compute controller 1110 to receive and process vector data. In embodiments where compute nodes send explicit compute instructions to the compute-enabled switch, compute controller 1110 may begin a processing task in response to dequeuing an instruction to perform that task from an ingress queue 1120. Such an instruction may have arrived at the switch as metadata in the same data unit(s) as the vector data, or as a separate control instruction (e.g., in a separate data unit). The separate control instruction may be received at the same time as the vector data, or, in some embodiments, may be a resource allocation request, which the compute controller 1110 may need to respond to before the compute nodes can begin transmitting the vector data associated with the instruction.

In an embodiment, the controller 1110 may not necessarily receive an explicit compute instruction, but determines a compute instruction based on the vector data itself. For example, when dequeuing vector data that is associated with a new container data set identifier, the compute controller 1110 may access configuration information indicating what type of reduction operation should be performed on the new container data set. The configuration information may, for instance, specify a default collective action for new container data sets. In some cases, the default collective action may be determined based on some attribute of the vector data and/or the data units in which the vector data were received. For instance, a certain default reduction operation may be selected based on a data type identifier specified in the vector data. Default collective actions may be specified on a global, per-application, per-transaction, or other basis. Or, the compute controller 1110 may have received information mapping the container data set identifier to associated collective action in advance.

In an embodiment, the compute controller 1110 may begin to coordinate processing of a compute instruction by, among other steps, initializing one or more processing contexts for the instruction. A processing context may be created for each transaction or container data set that will be processed for the instruction, and may include a data structure that the compute controller 1110 uses to stage processing of that transaction or container data set. Processing context information may be stored in the buffer 1140, or in a separate and potentially faster memory dedicated specifically to storing processing contexts, as previously described. In an embodiment, such processing context information may instead be created when vector data for the processing context is first read or received.

In an embodiment, the processing context may include, for instance, information indicating what operation(s) are to be performed by the compute engine 1170 and in which order, what memory locations are to be read, when those memory locations are to be read, worker set identifiers, application identifiers, container data set identifiers, in-progress result data, and so forth. The in-progress result data may include, for example, intermediate results, such as a running sum of vector elements in a chunk data set that has been received and processed thus far. In an embodiment, the processing context may further include a count and/or list of compute nodes whose data has been received, or whose data has yet to be received, for a chunk data set or transaction.

In some embodiments, as compute controller 1110 dequeues vector data for a processing task, it determines an optimal read order for the processing task. In some embodiments, the compute controller 1110 may even begin to pre-fetch certain vector data, which may be cached until compute controller 1110 determines to begin the collective action.

The compute controller 1110 is responsible for configuring the compute engine 1170 for the specific operation(s) needed for a processing task, dictating the sequence and priority of the operations that the compute engine 1170 performs. For instance, the controller 1110 may determine which collective processing units should perform which tasks on which inputs in a given clock cycle. Depending on the amount of data to be processed and the types of operations to be performed, a collective operation on a vector or vector chunk may involve any number of stages over any number of clock cycles.

Using the processing context, the compute controller 1110 monitors the available vector data received for a container data set and determines an appropriate time to begin the associated collective operation. In some cases, the compute controller 1110 waits until all containers for a container data set or transaction have been received. At that time, the compute controller 1110 configures the compute engine 1170 in the manner needed for the collective action, and causes the compute engine 1170 to begin inputting and processing data.

In some cases, the compute controller 1110 may begin processing a container data set before all containers in the container data set have been received. For examples, summations or other reductions between large quantities of vector data may need to broken up into distinct stages, each comprising one or more distinct operations. When enough vector data has arrived for one stage, the compute controller 1110 may optionally begin processing of that stage even as vector data continues to be received for the container data set. Between stages, intermediate results and processing instructions may be stored in a local staging area until the intermediate results are inputted into a subsequent stage. Optionally, between stages, the compute controller 1110 may reconfigure the compute engine 1170 for different sub-operations in the next stage.

The compute controller 1110 binds inputs to the compute engine 1170 for each compute operation that the compute engine 1170 is instructed to perform. In an embodiment, rather than binding vector data from the buffer 1140 directly to the compute engine 1170, the compute controller instructs a data formatter 1150 to input the vector data (optionally, by means of scheduling read operation(s) through the buffer controller 1130). The data formatter 1150 may be hard-coded to perform certain formatting operations, such as removing headers, or the compute controller 1110 may instruct the data formatter to perform certain formatting operations.

The data formatter 1150 is configured to input its data into the data normalizer 1160, which is an example of the afore-mentioned data normalizer. The data normalizer 1160 may be hard-coded to convert vector data values to a certain representation, or the compute controller 1110 may instruct the data formatter to perform certain conversion operations. The compute controller 1110 links specific outputs from the data normalizer 1160 to specific processing logics of the compute engine 1170, thereby causing specific compute operations to be performed on specific formatted and normalized vector data values.

Once the vector data and the associated computation instruction have been processed, the compute controller 1170 stores the result in a suitable memory (e.g., in a local staging memory or data buffer 1140) prior to being scheduled for transmission to a network interface. Storage of the result may involve passing the result through the data normalizer 1160 and data formatter 1150 for conversion and formatting prior to storage. If the result is an intermediate result, it may subsequently be read from the buffer 1140 again for additional compute operation(s), or the result may be written to another buffer memory or cache (not depicted).

Scheduler

A scheduler 1190 is responsible for coordinating transfers from compute subsystem 1100 to a network interface. The scheduler 1190 schedules result data units for transmission to the compute nodes based on the egress queues 1180. In an embodiment, the scheduler 1190 may be configured to arbitrate access to network interface bandwidth between packet data and vector data using standard packet scheduling algorithms (e.g., weighted round robin, weighted deficit round robin, weighted fair queueing, strict priority, etc.).

In some modes, the controller and scheduler may be coupled such that, when a given computation completes, the bandwidth is immediately available for transmitting to downstream network interfaces.

Miscellaneous

FIG. 11 illustrates one possible approach for implementing a compute subsystem. Other approaches may include fewer, additional, and/or different elements in varying arrangements. For example, the data formatters 1150 and/or data normalizer 1160 may be omitted, or their orders may be reversed. As another non-limiting example, there may be multiple compute engines, each fed by a different compute data pipeline, which may be controlled by a single centralized compute controller, or by a number of separate compute controllers.

Compute subsystems may take other forms in other embodiments. For instance, the afore-mentioned patent applications describe a variety of other centralized, ingress-based, and egress-based architectures for a compute subsystem. Yet other architectures for a compute subsystem will be apparent to the skilled person.

According to an embodiment, a compute subsystem may be optimized using a specialized compute memory component, known as a compute memory, that merges the buffer memory with the compute operation logics. Such a specialized memory unit may be any type of memory, and is divided into addressable entries. The compute memory element further comprises compute logic. Compute logic may include various compute processing units configured to perform various primitive operations, such as add, multiply, XOR, AND, and so forth. A write instruction to the compute memory element includes not only an address and data to write, but also an operation indicator. Instead of writing the data directly to the indicated address, the data stored at that address is first read from the memory. The operation indicator is used to select a specific compute operation supported by the compute logic. The compute logic feeds both the data from the write instruction and the stored data to the appropriate compute processing logic for the indicated operation. The compute processing logic outputs the result, which is then written to the memory at the address. Such a compute memory element may be used to avoid the need to store each container that needs to be reduced separately, and instead maintain a running sum or other running result for an in-place reduction operation. In an embodiment, a compute memory may, for at least certain collective operations, be utilized in place of a compute engine.

4.6. Packet-Switching Logic

In some embodiments, a compute-enabled switch may optionally include packet-switching logic configured to utilize packet-switching techniques to receive, process, and forward data units. For instance, a compute-enabled switch may include one or more switch "chips" (e.g., Application-Specific Integrated Circuit ("ASICs"), Field Programmable Gate Arrays ("FPGAs"), or other integrated circuits) on which instances of packet-switching logic are implemented. Generally, packet-switching logic is configured to receive packets or other data units via the switch's communication interface(s), identify destination(s) for the data units, perform optional processing of the data units, and then forward the data units out communication interface(s) associated with those destinations. The packet-switching logic may include a variety of components, such as traffic managers, buffers, packet processors, and queues.

In an embodiment, a compute-enabled switch may include logic by which it recognizes which data units need to be processed by its compute subsystem, and which data units should be processed by the packet-switching logic. The logic may discern between the two types of data units based on type information, flags, or even addresses in the headers of the data units, or any other suitable information in the header or payload of a data unit. The logic may be deployed in front of the packet-switching logic and compute subsystem, such that it is applied all incoming data units as they are received by the switch. Or, the logic may be integrated into the packet-switching logic. For instance, an ingress packet processor of the packet-switching logic may be configured to recognize data units that carry vector data (the "compute data units"), and forward those data units to the compute subsystem for collective operations instead of or in addition to a traffic manager of the packet-switching logic.

When necessary for purposes of clarity, to differentiate between data units that are processed exclusively by packet-switching logic and data units that are processed by the compute subsystem, the first data units (i.e. those handled exclusively by packet-switching logic) may be referred to herein as "network data units" or "normal data units," whereas the second data units may be referred to as compute data units. In an embodiment, whereas network data units are typically addressed to devices other than the switch, compute data units are directed directly to the switch. However, some network data units may nonetheless directly target the switch for network initialization, administration, and/or maintenance purposes. Moreover, in some embodiments, the switch may be configured to transparently intercept and reduce compute data units addressed to some other device.

The compute subsystem may be integrated with the packet-switching subsystem to varying degrees. For instance, in an embodiment, there may be a single centralized compute subsystem to which the packet-switching subsystem forwards all compute data units. Such a subsystem may or may not share buffer resources and/or other resources with the packet-switching subsystem. In another embodiment, various instances of logic for the compute subsystem may be distributed across different components of the packet-switching logic, such as within multiple traffic managers. Examples of these and other embodiments are described elsewhere herein.

Figure 12:
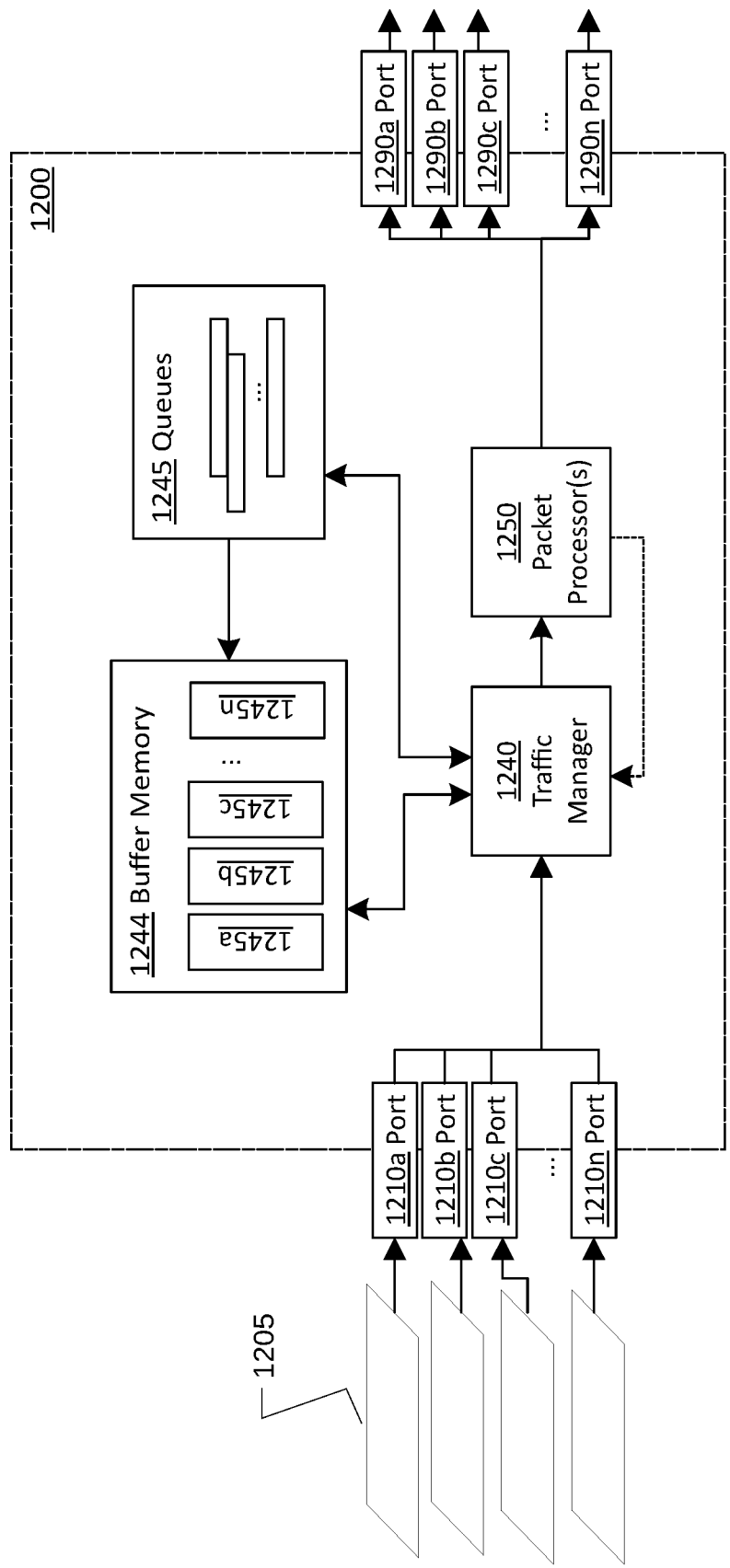
FIG. 12 is an illustrative view of various aspects of packet-switching logic within an example network device.

FIG. 12 is an illustrative view of various aspects of packet-switching logic within an example network device 1200, according to an embodiment. While, for ease of illustration, FIG. 12 omits depiction of any compute subsystem, network device 1200 may be the same as compute-enabled switching device 150, network compute node 550, and so forth. However, compute-enabled switching device 150 and network compute node 550 may be practiced without the specific details of FIG. 12.

Network device 1200 is a computing device comprising any combination of hardware and software configured to implement the various logical components described herein, including components 1210-1290. For example, the apparatus may be a single networking computing device, such as a router or switch, in which some or all of the components 1210-1290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 1210-1290.

Device 1200 is generally configured to receive and forward data units 1205 to other devices in a network by means of a series of operations performed at various components within the device 1200. In an embodiment, device 1200 may itself be one of a number of components within a larger box or chassis. For instance, network device 1200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 1205 through various subcomponents of the packet-switching logic of device 1200 is as follows. After being received via a port 1210, a data unit 1205 may be buffered by an arbiter (not depicted) until the data unit 1205 can be processed by an ingress packet processor 1250, and then delivered to an interconnect (not depicted). From the interconnect, the data unit 1205 may be forwarded to a traffic manager 1240. The traffic manager 1240 may store the data unit 1205 in a buffer 1244 and assign the data unit 1205 to a queue 1245. The traffic manager 1240 manages the flow of the data unit 1205 through the queue 1245 until the data unit 1205 is released to an egress packet processor 1250. Depending on the processing, the traffic manager 1240 may then assign the data unit 1205 to another queue so that it may be processed by yet another egress processor 1250, or the egress packet processor 1250 may send the data unit 1205 to an egress arbiter (not depicted) from which the data unit 1205 is finally forwarded out another port 1290. Of course, depending on the embodiment, the switching logic may omit some of these subcomponents and/or include other subcomponents in varying arrangements.

Example components of a device 1200 are now described in further detail.

Ports

Network device 1200 includes ports 1210/990, which may be similar to ports 290 depicted in FIG. 2. Ports 1210/1290 are connected to network interfaces. Ports 1210, including ports 1210a-n, are inbound ("ingress") ports by which data units 1205 are received from other devices in a network via the network interfaces. Ports 1290, including ports 1290a-n, are outbound ("egress") ports by which at least some of the data units 1205 are sent out the network interfaces to other destinations within the network, after having been processed by the packet-switching logic of network device 1200.

Ports 1210/1290 are depicted as separate ports for illustrative purposes, but may actually correspond to the same physical network interfaces on the network device 1210. That is, a network device 1200 may both receive data units 1205 and send data units 1205 over a single physical port, and the single physical port may thus function as both an ingress port 1210 and egress port 1290. Nonetheless, for various functional purposes, certain logic of the network device 1200 may view a single physical port as a separate ingress port 1210 and egress port 1290. Moreover, for various functional purposes, certain logic of the network device 1200 may subdivide a single physical ingress port or egress port into multiple ingress ports 1210 or egress ports 1290, or aggregate multiple physical ingress ports or egress ports into a single ingress port 1210 or egress port 1290. Hence, in various embodiments, ports 1210 and 1290 should be understood as distinct logical constructs that are mapped to physical interfaces rather than simply as distinct physical constructs.

Packet Processors

A device 1200 comprises one or more packet processing components 1250, or "packet processors." Different packet processors 1250 may be configured to perform different packet processing tasks. These tasks may include, for example, identifying paths along which to forward data units 1205, forwarding data units 1205 to egress ports 1290, implementing flow control and/or other policies, manipulating packets, performing statistical or debugging operations, and so forth. A device 1200 may comprise any number of packet processors 1250 configured to perform any number of processing tasks.

In an embodiment, the packet processors 1250 within a device 1200 may be arranged such that the output of one packet processor 1250 may, eventually, be inputted into another packet processor 1250, in such a manner as to pass data units 1205 from certain packet processor(s) 1250 to other packet processor(s) 1250 in a sequence of stages, until finally disposing of the data units 1205 (e.g. by sending the data units 1205 out an egress port 1290, "dropping" the data units 1205, etc.). The exact set and/or sequence of packet processors 1250 that process a given data unit 1205 may vary, in some embodiments, depending on attributes of the data unit 1205 and/or the state of the device 1200. Any number of packet processors 1250 may be chained together in this manner.

Based on decisions made while processing a data unit 1205, a packet processor 1250 may, in some embodiments, and/or for certain processing tasks, manipulate a data unit 1205 directly. For instance, the packet processor 1250 may add, delete, or modify information in a data unit header or payload. In other embodiments, and/or for other processing tasks, a packet processor 1250 may generate control information that accompanies the data unit 1205, or is merged with the data unit 1205, as the data unit 1205 continues through the device 1200. This control information may then be utilized by other components of the device 1200 to implement decisions made by the packet processor 1250.

In an embodiment, a packet processor 1250 need not necessarily process an entire data unit 1205, but may rather only receive and process a subunit of a data unit 1205, such as a cell comprising header information for the data unit. For instance, if the data unit 1205 is a packet comprising multiple cells, the first cell, or a first subset of cells, might be forwarded to a packet processor 1250, while the remaining cells of the packet (and potentially the first cell(s) as well) are forwarded in parallel to a merger component where they await results of the processing.

In an embodiment, a packet processor may be generally classified as an ingress packet processor 1250 or an egress packet processor 1250. Generally, an ingress processor 1250 resolves destinations for a traffic manager 1240 to determine which ports 1290 and/or queues 1245 a data unit 1205 should depart from. There may be any number of ingress processors 1250, including just a single ingress processor 1250.

In an embodiment, an ingress processor 1250 performs certain intake tasks on data units 1205 as they arrive. These intake tasks may include, for instance, and without limitation, parsing data units 1205, performing routing related lookup operations, categorically blocking data units 1205 with certain attributes and/or when the device 1200 is in a certain state, duplicating certain types of data units 1205, making initial categorizations of data units 1205, and so forth. Once the appropriate intake task(s) have been performed, the data units 1205 are forwarded to an appropriate traffic manager 1240, to which the ingress processor 1250 may be coupled directly or via various other components, such as an interconnect component.

The egress packet processor(s) 1250 of a device 1200, by contrast, may be configured to perform non-intake tasks necessary to implement the switching logic of the device 1200. These tasks may include, for example, tasks such as identifying paths along which to forward the data units 1205, implementing flow control and/or other policies, manipulating data units, performing statistical or debugging operations, and so forth. In an embodiment, there may be different egress packet processors(s) 1250 assigned to different flows or other categories of traffic, such that not all data units 1205 will be processed by the same egress packet processor 1250.

In an embodiment, each egress processor 1250 is coupled to a different group of egress ports 1290 to which they may send data units 1205 processed by the egress processor 1250. In an embodiment, access to a group of ports 1290 may be regulated via an egress arbiter coupled to the egress packet processor 1250. In some embodiments, an egress processor 1250 may also or instead be coupled to other potential destinations, such as an internal central processing unit, a storage subsystem, or a traffic manager 1240.

Buffers

Since not all data units 1205 received by the device 1200 can be processed by the packet processor(s) 1250 at the same time, various components of device 1200 may temporarily store data units 1205 in one or more buffers 1244 while the data units 1205 are waiting to be processed. For example, a certain packet processor 1250 may only be capable of processing a certain number of data units 1205, or portions of data units 1205, in a given clock cycle, meaning that other data units 1205, or portions of data units 1205, destined for the packet processor 1250 must either be ignored (e.g., dropped) or stored. At any given time, a large number of data units 1205 may be stored in the buffers 1244 of the device 1200, depending on network traffic conditions.

A device 1200 may include a variety of buffers 1244, each utilized for varying purposes and/or components. A buffer 1244 may be implemented using a single physical memory unit (e.g. SRAM, DRAM, etc.), a designated portion of a memory unit, or a collection of memory units, depending on an embodiment.

Generally, a data unit 1205 awaiting processing by a component is held in a buffer 1244 associated with that component until the data unit 1205 is "released" to the component for processing. For example, a traffic manager 1240 will typically have a relatively large buffer 1244, referred to as an egress buffer, in which it buffers data units 1205 prior to releasing those data units 1250 to an egress packet processor 1250.

Various metrics related to the buffers 1244 may be tracked, such as the number of buffer entries utilized, percentage of buffer space utilized, and so forth. These metrics may be global, or specific to a context. For instance, the amount of buffered data assigned to a specific queue or port may be tracked. Utilization metrics for these contexts may be calculated as percentages of amounts of buffer space allocated to these contexts.

Queues

In an embodiment, to manage the order in which data units 1205 are processed from buffers 1244, various components of a device 1200 may implement queueing logic. For example, the flow of data units 1205 through the egress buffers 1244 of traffic manager 1240 may be managed using egress queues while the flow of data units 1205 through the buffers of an ingress arbiter might be managed using ingress queues.

A queue 1245 is a set of data nodes arranged in some order by metadata describing the queue 1245. The queue 1245 includes a head node, or head, which is typically the next node to be processed, and a tail node, or tail, which is typically the node most recently added to the queue. A node will typically progress from the tail to the head over time as other nodes are processed and removed from the queue.

In the case of queue 1245, the nodes are data unit 1205, or the buffer locations(s) at which the data unit 1205 begins. A data unit 1205 that has been added to a queue 1245 is said to be "linked" to that queue 1245. A data unit 1205 may belong to one or more queues 1245.

In many embodiments, the sequence in which the queue 1245 arranges its constituent data units 1205 generally corresponds to the order in which the data units 1205 or data unit portions in the queue 1245 will be released and processed. In some embodiments, the number of data units 1205 or data unit portions assigned to a given queue 1245 at a given time may be limited, either globally or on a per-queue basis, and this limit may change over time.

In an embodiment, queues 1245 are implemented using a linking memory referred to an "inter-packet" link memory, which is separate from the associated buffer memory 1244. Each entry in the link memory is said to be a node in the queue. Each link entry points comprises a data pointer, which, when the link entry is occupied, points to a memory location in the buffer memory 1244 at which a corresponding data unit (or at least the start of the data unit) is found (e.g. a buffer entry, a first entry for the data unit in an intra-packet link memory, etc.). Each entry in the link memory further may further comprises a link pointer to another link entry, which corresponds to the next node in the queue. Of course, in other embodiments, other types of linking memories and/or other structures may instead be utilized instead to represent the queue.

Traffic Management

According to an embodiment, a device 1200 further includes one or more traffic managers 1240 configured to control the flow of data units 1205 to one or more packet processor(s) 1250. A traffic manager 1240 may receive data units 1205 directly from a port 1210, from an ingress processor 1250, and/or other suitable components of device 1200. In an embodiment, the traffic manager 1240 is configured to receive up to one cell from each possible source (e.g. each port 1210) each clock cycle of the traffic manager 1240.

Traffic manager 1240 may include or be coupled to buffers 1244 for buffering data units 1205 prior to sending those data units 1205 to their respective processor(s) 1250. A buffer manager within the traffic manager 1240 may temporarily store data units 1205 in buffers 1244 as they await processing by processor(s) 1250. A data unit 1205 or data unit portion in a buffer 1244 may eventually be "released" to one or more processor(s) 1250 for processing, by reading the data unit 1205 from the buffer 1244 and sending the data unit 1205 to the processor(s) 1250. In an embodiment, traffic manager 1240 may release up to a certain number of data units 1205 from buffers 1244 to processors 1250 each clock cycle.

Beyond managing the use of buffers 1244 to store data units 1205 (or copies thereof), a traffic manager 1240 may include queue management logic configured to assign data units 1205 to queues 1245 and manage the flow of data units 1205 through queues 1245. The traffic manager 1240 may, for instance, "enqueue" a data unit 1205 that has been fully buffered by identifying a specific queue 1245 to assign the data unit 1205 to, and then linking a data unit identifier or other metadata to the assigned queue. The traffic manager 1240 may further determine when to release—also referred to as dequeuing—data units 1205 from queues 1245 by sending instructions to the buffer manager 1244 to read/release the data units 1205 and then providing the data read from the buffer 1244 to specific packet processor(s) 1250.

Though only one packet processor 1250 and traffic manager 1240 are depicted, a device 1200 may comprise any number of packet processors 1250 and traffic managers 1240. For instance, different sets of ports 1210 and/or ports 1290 may have their own traffic manager 1240 and packet processors 1250. As another example, in an embodiment, the traffic manager 1240 may be duplicated for some or all of the stages of processing a data unit. For example, system 1200 may include a traffic manager 1240 and egress packet processor 1250 for an egress stage performed upon the data unit 1205 exiting the system 1200, and/or a traffic manager 1240 and packet processor 1250 for any number of intermediate stages. The data unit 1205 may thus pass through any number of traffic managers 1240 and/or packet processors 1250 prior to exiting the system 1200. In other embodiments, only a single traffic manager 1240 is needed. If intermediate processing is needed, flow of a data unit 1205 may loop back to the traffic manager 1240 for buffering and/or queuing after each stage of intermediate processing.

In an embodiment, a traffic manager 1240 is coupled to the output of an ingress packet processor(s) 1250, such that data units 1205 (or portions thereof) are assigned to buffers 1244 only upon being initially processed by an ingress packet processor 1250. Once in an egress buffer 1244, a data unit 1205 (or portion thereof) may be "released" to one or more egress packet processor(s) 1250 for processing.

In the course of processing a data unit 1205, a device 1200 may replicate a data unit 1205 one or more times for purposes such as, without limitation, multicasting, mirroring, debugging, and so forth. For example, a single data unit 1205 may be replicated to multiple egress queues 1245. For instance, a data unit 1205 may be linked to separate queues 1245 for each of ports 1, 3, and 12. As another example, a data unit 1205 may be replicated a number of times after it reaches the head of a queue 1245 (e.g. for different egress processors 1250). Hence, though certain techniques described herein may refer to the original data unit 1205 that was received by the device 1200, it will be understood that those techniques will equally apply to copies of the data unit 1205 that have been generated for various purposes.

Forwarding Logic

The logic by which a device 1200 determines how to handle a data unit 1205—such as where and whether to send a data unit 1205, whether to perform additional processing on a data unit 1205, etc.—is referred to as the forwarding logic of the device 1200. This forwarding logic is collectively implemented by a variety of the components of the device 1200, such as described above. For example, an ingress packet processor 1250 may be responsible for resolving the destination of a data unit 1205 and determining the set of actions/edits to perform on the data unit 1205, and an egress packet processor 1250 may perform the edits. Or, the egress packet processor 1250 may also determine actions and resolve a destination in some cases. Also, there may be embodiments where the ingress packet processor 1250 performs edits as well.

In an embodiment, a device 1200 will typically store in its memories one or more forwarding tables (or equivalent structures) that map certain data unit attributes or characteristics to actions to be taken with respect to data units 1205 having those attributes or characteristics, such as sending a data unit 1205 to a selected path, or processing the data unit 1205 using a specified internal component. For instance, such attributes or characteristics may include a Quality-of-Service level specified by the data unit 1205 or associated with another characteristic of the data unit 1205, a flow control group, an ingress port 1210 through which the data unit 1205 was received, a tag or label in a packet's header, a source address, a destination address, a packet type, or any other suitable distinguishing property. A device 1200 may, for example, implement logic that reads such a table, determines one or more ports 1290 to send a data unit 1205 to based on the table, and sends the data unit 1205 to an egress processor 1250 that is coupled to the one or more ports 1290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

As data units 1205 are routed through different nodes in a network, the nodes may, on occasion, discard, fail to send, or fail to receive certain data units 1205, thus resulting in the data units 1205 failing to reach their intended destination. The act of discarding of a data unit 1205, or failing to deliver a data unit 1205, is typically referred to as "dropping" the data unit. Instances of dropping a data unit 1205, referred to herein as "drops" or "packet loss," may occur for a variety of reasons, such as resource limitations, errors, or deliberate policies. Different components of a device 1200 may make the decision to drop a data unit 1205 for various reasons. For instance, a traffic manager 1240 may determine to drop a data unit 1205 because, among other reasons, buffers 1244 are overutilized, a queue 1245 is over a certain size, a port 1290 (or its associated interface) is too busy, and/or a data unit 1205 has a certain characteristic.

Miscellaneous

Although, for ease of explanation, the term "packet" is used in describing packet-switching logic, it will be recognized that, depending upon the standards utilized, the packet-switching logic may process and forward data units of other types instead of, or in addition to, packets. Such data units may include, for instance, frames, cells, segments, datagrams, etc.

Device 1200 illustrates only several of many possible arrangements of components in a network device configured to provide the functionality described herein. Other arrangements may include fewer, additional, or different components, and the division of work between the components may vary depending on the arrangement.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

4.7. Example Distributed Learning Application

In an embodiment, a distributed application may be an implementation of an iterative optimization algorithm, such as a gradient descent algorithm for a deep neural network, in a synchronous or asynchronous distributed manner. Any suitable gradient descent algorithm may be implemented, including without limitation stochastic gradient descent, batch gradient descent, or mini-batch gradient descent. Other such optimization algorithms may, for instance, use similar reception strategies to find minima, maxima, or other sets of values. In other embodiments, system 300 may be optimized for any distributed machine learning task.

Each compute process has access to a copy of some or all of the neural network to be trained. The neural network may be any suitable type of artificial neural network, comprising any number of neurons, connections, and/or layers. Depending on the training technique utilized, each node's model may be a full replica of the neural network, or may just include a subset of the neural network, such as a specific layer or branch. In the partial replica case, gradient descent may be performed on the backward pass instead of the forward pass. However, other collective operations may be performed on the forward pass, such as exchanging activations of neurons between nodes using a broadcast collective.

The neural network operates in accordance with a set of parameters. The parameters are generally a set of weights. Each connection in the neural network has an associated weight, the value of which affects how heavily the connection is factored into determining the output of the neuron to which the connection leads. In some neural networks, the parameters may also include bias values, with each connection further having a separate bias value. Other neural networks may have other types of parameters.

The object of the training logic at each compute process is to, in coordination with the rest of the components of learning system, identify or "learn" which parameters to use for the neural network. The parameters are learned through a process of iteratively testing and adjusting the parameters on training data from a training data set. The training logic is configured to begin the training process with an initial set of parameters to test (i.e., for the first epoch). Each process's training logic may begin with the same set of parameters, which may be set to a default value expected by all processes (e.g., each weight may be 0), or to randomized values agreed to during an initialization process. The training data set includes a number of input vectors for the neural network, along with the expected output for each input vector. Depending on the learning technique employed, each process may have the same training data set, or a different training data set.

During an epoch, the training logic performs one or more forward passes on the neural network using the parameters, each time inputting a different input vector from the training data set. The data that the process trains on during an epoch may be referred to as a batch, and may further have a batch identifier. Depending on the learning technique, the batch may be the set of all input vectors in the process's training data set, a single input vector, or a subset of the training data set (often known as a "mini-batch"). In the latter two cases, the input vector(s) may be selected randomly or systematically, depending on the system.

Each forward pass will produce an output, also referred to as a prediction. Each prediction is compared to the expected output for the input vector that produced the prediction. The training logic is configured to calculate an error in the prediction, or loss, using a cost function of the prediction and expected output. Such a cost function may be fixed (e.g., a means squared error function), or defined by the model.

Based on the error in a prediction, the training logic computes a gradient. A gradient comprises a vector of values, each of which may be referred to as a gradient element. Each gradient element has a corresponding parameter in parameters. Each parameter's gradient element generally indicates a direction (i.e. increase or decrease) in which the parameter should be adjusted, as well as a relative magnitude of that adjustment. Each gradient element may be, for example, a partial derivative of the cost function with respect to the parameter that corresponds to the gradient element.

As mentioned, in each epoch, the training logic may test any number of input vectors from the training data set using the same parameters, in series or in parallel (e.g., if the compute process includes multiple GPUs, processors, or other suitable hardware). Each forward pass produces a gradient. If a compute process performs more than one forward pass in an epoch, the process may combine (e.g., average, sum, etc.) the resulting gradients together to produce a single gradient.

At the end of an epoch, a compute node is configured to, collectively, send the gradient(s) computed thereat during that epoch to one or more compute-enabled switches, in manners described elsewhere herein. A gradient may be communicated in any suitable form, such as payload data within an Internet Protocol packet or other data unit. Since some models may include thousands, millions, or even greater numbers of neurons, a gradient may need to be divided amongst a number of data units, in which case each data unit may include a gradient identifier or other suitable information by which the data units in which the gradient is being communicated can subsequently be identified.

Via network compute processes such as described elsewhere herein, the compute-enabled switches are configured to collect gradients from the compute nodes and reduce those gradients together through reduction operations, such as a summation or average. As described elsewhere herein, in response to sending a gradient, the compute processes in each node will eventually receive a single result gradient of the reduction operation.

The training logic is configured to adjust its parameters based on the result gradient through a process known as backpropagation. The training logic may perform various operations such as averaging the result gradient across the total number of nodes, multiplying the result gradient by a fixed or variable learning rate, adding or subtracting the result gradient from the parameters, and so forth, to arrive at a new set of parameters.

Once the new set of parameters is determined, the training logic may begin testing the model in a new epoch. This epoch may or may not necessarily utilize the same input vectors as in the previous epoch, depending on the embodiment. The process of generating a gradient, receiving a result gradient, and adjusting the parameters may be repeated for any number of epochs, until a terminal condition is reached, such as performing a predefined number of epochs, converging upon a set of parameters that is not changing more than a threshold amount each epoch, and so forth. The final set of parameters may then be used for inference (e.g. processing new data with the model, for which the expected output is not known).

In some embodiments, after reaching a terminal condition, the training process may be repeated again with a different set of initial parameters. This additional training may be utilized, for instance, to increase the likelihood of finding a global minimum instead of a merely local minimum for the gradient descent algorithm. The loss from the parameters converged upon in each iteration of the training process may be compared so as to select the parameters with the lowest cost.

5.0. Example Embodiments

Examples of some embodiments are represented, without limitation, as follows:

A distributed computing system comprising: a plurality of compute nodes, each compute node of the compute nodes comprising: a plurality of device ports, each connected to a different compute-enabled switch of a plurality of compute-enabled switches; and a plurality of compute entities, each compute entity of the plurality of compute entities configured to execute a compute process that generates a local vector comprising values for a common set of vector elements; wherein the compute node is configured to, for each vector element subset of a plurality of subsets in the common set of vector elements, based on each generated local vector, send a vector chunk comprising values for the vector element subset out a different port of the plurality of device ports; the plurality of compute-enabled switches, each compute-enabled switch of the compute-enabled switches comprising: a plurality of switch ports, each compute node of the plurality of compute nodes connected to the compute-enabled switch via a different port of the plurality of switch ports; and one or more network compute entities configured to execute a network compute process that reduces vector chunks received over the plurality of switch ports into a single result chunk, the vector chunks and the single result chunk each having values for a same vector element subset; the compute-enabled switch configured to send the result chunk to each compute node of the plurality of compute nodes.

In an embodiment, for each compute node, sending the vector chunk comprises sending multiple packets comprising different portions of vector data from the vector chunk.

In an embodiment, for all local vectors generated at a given compute node, the given compute node is configured to reduce the local vectors to a node vector, each vector chunk sent by the given compute node being a different chunk of the node vector.

In an embodiment, the given compute node is configured to reduce the local vectors by, for each particular compute process of the plurality of compute processes executing at the given compute node: assigning the particular compute process to a particular vector element subset of the vector element subsets; sending a chunk of the local vector generated by the particular compute process to each other compute process of the plurality of compute processes, the chunk carrying values for the vector element subset assigned to the other compute process; reducing a plurality of chunks received from the other compute processes in the plurality of compute processes into a node chunk carrying values for the particular vector element subset; sending the node chunk out a particular port of the plurality of device ports to a particular compute-enabled switch assigned to the particular vector element subset; receiving a particular result chunk via the particular port; and sharing the particular result chunk with each of the other compute processes in the plurality of compute processes.

In an embodiment, each particular compute process of the plurality of compute processes executing at each compute node of the plurality of compute nodes is configured to: reduce particular chunks of local vectors generated by the plurality of compute processes at the compute node into a node chunk comprising values for a particular vector element subset assigned to the particular compute process; send the node chunk out a particular port of the plurality of device ports; receive, via the particular port, a particular result chunk comprising values for the particular vector element subset; share the particular result chunk with each other compute process in the plurality of compute processes at the compute node.

In an embodiment, the particular port is directly coupled to a particular compute entity that executes the particular compute process, each of the plurality of device ports in a compute node directly coupled to a different one of the plurality of compute entities in the compute node.

In an embodiment, each compute node of the plurality of compute nodes is configured to share each result chunk of a plurality of result chunks received from the plurality of compute-enabled switches with each compute process of the plurality of compute processes executed by the compute node, each result chunk received from a different compute-enabled switch of the plurality of compute-enabled switches; wherein each of the plurality of compute processes combines the plurality of result chunks to form a single result vector comprising a single value for each element in the common set of vector elements.

In an embodiment, reducing the vector chunks comprises, for each vector element in the vector element subset, performing one or more reduction operations between each value in the vector chunks that corresponds to the vector element, the reduction operations including one or more of: summation, averaging, multiplying, selecting a minimum value, or selecting a maximum value.

In an embodiment, each compute process of the plurality of computing processes at each of the plurality of compute nodes belongs to a worker set executing a common distributed application, each result chunk generated by each compute-enabled switch forming, collectively, a result vector for that distributed application.

In an embodiment, each compute-enabled switch of the plurality of compute-enabled switches maintains a processing buffer for the distributed application, the processing buffer buffering values only for a vector element subset assigned to the compute-enabled switch, and not for other elements in common set of vector elements.

In an embodiment, for the common set of vector elements, each compute-enabled switch of the plurality of compute-enabled switches receives only vector chunks that have values for a vector element subset assigned to the compute-enabled switch, and not vector chunks that have values for vector element subsets within the common set that are not assigned to the compute-enabled switch.

In an embodiment, each compute process of the plurality of computing processes at each of the plurality of compute nodes implements training logic for training parameters of a model, each local vector being a local gradient generated by the compute process based on testing the model on a training data set assigned to the compute process, each vector element of the common set of vector elements corresponding to a different one of the parameters, each compute process configured to adjust the parameters based on a result gradient formed by combining each result chunk generated by the plurality of compute-enabled switches, the result gradient having a single value for each vector element of the common set of vector elements.

In an embodiment, the system further comprises: a plurality of compute planes of compute nodes, each comprising a separate group of compute nodes and compute-enabled switches configured in the same manner as the plurality of compute nodes and the plurality of compute-enabled switches; wherein each compute-enabled switch of the compute-enabled switches is coupled by an inter-plane communication mechanism to at least one other compute-enabled switch that is assigned to reduce a same vector element subset as the compute-enabled switch, the compute-enabled switch configured to share with the other compute-enabled switch an intermediate result chunk reduced from the vector chunks that the compute-enabled switch received from the plurality of compute nodes in the same plane as the compute-enabled switch, the compute-enabled switch configured to generate the result chunk to send back to the plurality of compute nodes in the same plane based also on one or more intermediate result chunks received via the inter-plane communication mechanism.

In an embodiment, a particular compute process of the plurality of compute processes executing at each compute node of the plurality of compute nodes is configured to: reduce particular chunks of local vectors generated by the plurality of compute processes at the compute node into two or more node sub-chunks, each of the sub-chunks comprising values for a different vector element subset assigned to the particular compute process; send each of the sub-chunks out a different port, of the plurality of device ports, that is coupled to the particular compute process; for each of the different vector element subsets assigned to the particular compute process: receive a particular result sub-chunk comprising values for the vector element subset; and share the particular result sub-chunk with each other compute process in the plurality of compute processes at the compute node.

In an embodiment, a given compute-enabled switch of the plurality of compute-enabled switches is configured to detect an error related to the processing of vector data that the given compute-enabled switch receives, and send a message associated with that error out each of the plurality of switch ports.

In an embodiment, the compute-enabled switch includes packet-switching logic configured to forward network data units that do not carry vector data out switch ports that include at least first switch ports not in the plurality of switch ports.

In an embodiment, each compute entity of the plurality of compute entities comprises one or more of a GPU, CPU, TPU, ALU, or an FPU.

According to an embodiment, a method comprising: at each compute node of a plurality of compute nodes: generating, at each compute process of a plurality of compute processes, a local vector comprising values for a common set of vector elements; for each vector element subset of a plurality of subsets in the common set of vector elements, based on each generated local vector, sending a vector chunk comprising values for the vector element subset out a port of the compute node that is associated with the vector element subset, each vector element subset associated with a different port of the compute node; at each compute-enabled switch of a plurality of compute-enabled switches: receiving vector chunks over a plurality of switch ports, each compute node of the plurality of compute nodes connected to the compute-enabled switch via a different port of the plurality of switch ports; reducing the vector chunks into a single result chunk, the vector chunks and the single result chunk each having values for a same vector element subset of the vector element subsets; sending the result chunk to each compute node of the plurality of compute nodes.

In an embodiment, the method further comprises, at each particular compute process of the plurality of compute processes executing at each compute node of the plurality of compute nodes: reducing particular chunks of local vectors generated by the plurality of compute processes at the compute node into a node chunk comprising values for a particular vector element subset, of the vector element subsets, that is assigned to the particular compute process; sending the node chunk out a particular port of the compute node; receiving, via the particular port, a particular result chunk comprising values for the particular vector element subset; sharing the particular result chunk with each other compute process in the plurality of compute processes at the compute node.

In an embodiment, reducing the vector chunks comprises, for each vector element in the vector element subset, performing one or more reduction operations between each value in the vector chunks that corresponds to the vector element, the reduction operations including one or more of summation, averaging, multiplying, selecting a minimum value, or selecting a maximum value.

In an embodiment, each compute process of the plurality of computing processes at each of the plurality of compute nodes belongs to a worker set executing a common distributed application, each result chunk generated by each compute-enabled switch forming, collectively, a result vector for that distributed application.

In an embodiment, at each compute-enabled switch of the plurality of compute-enabled switches, buffering, within a processing buffer for the distributed application, values only for a vector element subset assigned to the compute-enabled switch, and not for other elements in common set of vector elements.

In an embodiment, at each compute process of the plurality of computing processes at each of the plurality of compute nodes:

In an embodiment, generating the local vector comprises testing parameters of a model on a training data set assigned to the compute process, and calculating a local gradient based on results of the testing, the local vector being the local gradient, each vector element of the common set of vector elements corresponding to a different one of the parameters; the method further comprising: adjusting the parameters based on a result gradient formed by combining each result chunk generated by the plurality of compute-enabled switches, the result gradient having a single value for each vector element of the common set of vector elements.

In an embodiment, the plurality of compute devices and plurality of compute-enabled switches form a compute plane, the method further comprising: at each particular compute-enabled switch of the plurality of compute-enabled switches, sharing, via an inter-plane communication mechanism, an intermediate result chunk with at least one other compute-enabled switch in another compute plane that is also assigned to reduce the same vector element subset as the particular compute-enabled switch, the intermediate result chunk having been reduced from the vector chunks that the particular compute-enabled switch received from the plurality of compute nodes; generating the result chunk to send back to the plurality of compute nodes in the same plane based also on one or more intermediate result chunks received via the inter-plane communication mechanism.

In an embodiment, the method further comprises, at a particular compute process of the plurality of compute processes executing at each compute node of the plurality of compute nodes: reducing particular chunks of local vectors generated by other compute processes at the compute node into two or more node sub-chunks, each of the sub-chunks comprising values for a different vector element subset assigned to the particular compute process; sending each of the sub-chunks out a different port, of the compute node, that is coupled to the particular compute process; for each of the different vector element subsets assigned to the particular compute process: receiving a particular result chunk comprising values for the vector element subset; and sharing the particular result chunk with each other compute process at the compute node.

In an embodiment, the method further comprises, at a given compute-enabled switch of the plurality of compute-enabled switches: detecting an error related to the processing of vector data that the given compute-enabled switch receives; and sending a message associated with that error out each of the plurality of switch ports.

In an embodiment, the methods and techniques described herein may be implemented in full or in part by one or more computing devices executing instructions stored on one or more non-transitory computer-readable media.

Yet other example embodiments are described in other sections herein.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 13:
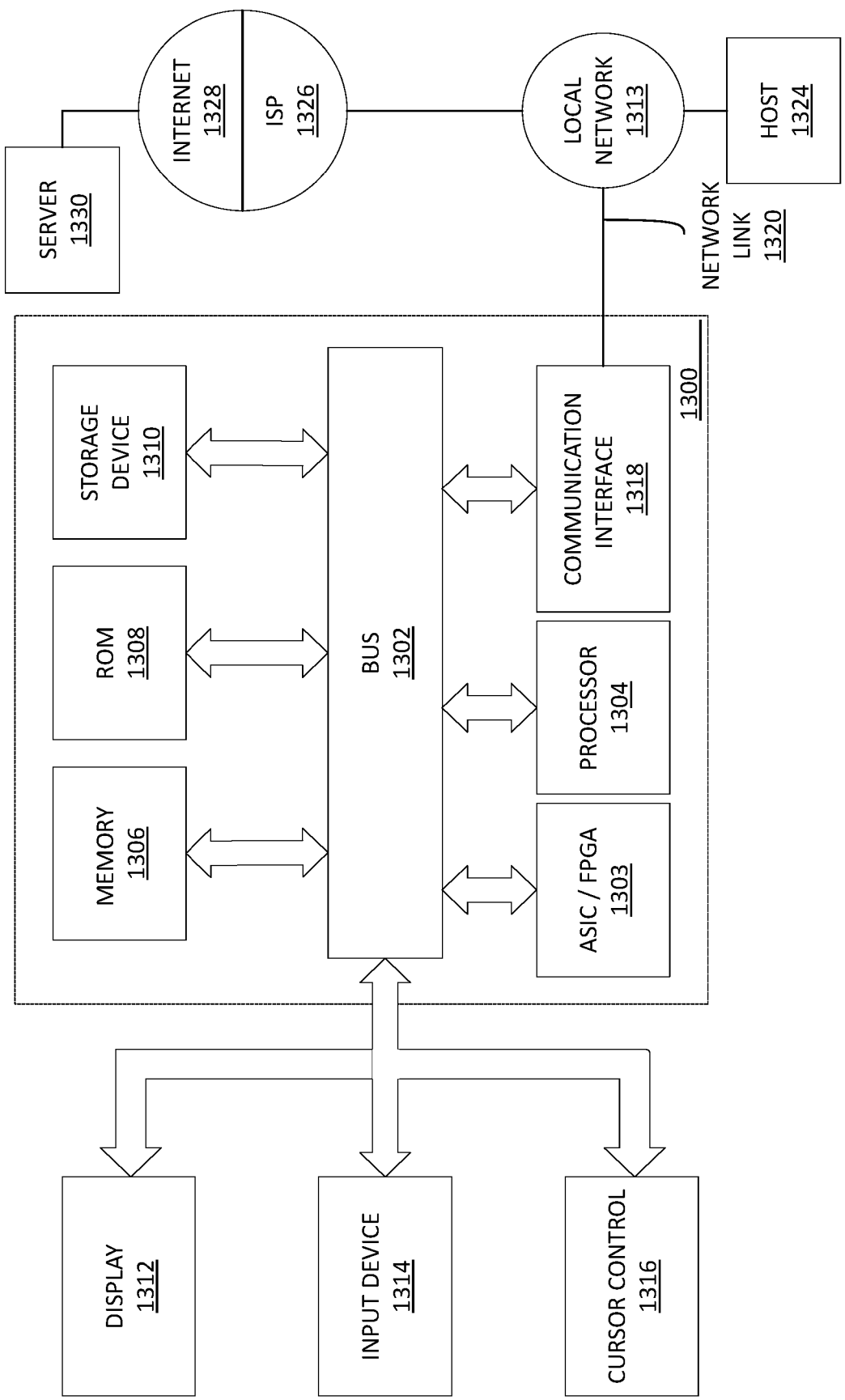
FIG. 13 is a block diagram that illustrates an example computer system that may be utilized in implementing the above-described techniques.

FIG. 13 is a block diagram that illustrates an example computer system 1300 that may be utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device. In an embodiment, FIG. 13 constitutes a different view of the devices and systems described in previous sections.

Computer system 1300 may include one or more ASICs, FPGAs, or other specialized circuitry 1303 for implementing program logic as described herein. For example, circuitry 1303 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1300 may include one or more hardware processors 1304 configured to execute software-based instructions. Computer system 1300 may also include one or more busses 1302 or other communication mechanism for communicating information. Busses 1302 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 1300 also includes one or more memories 1306, such as a RAM, hardware registers, or other dynamic or volatile storage device for storing data units to be processed by the one or more ASICs, FPGAs, or other specialized circuitry 1303. Memory 1306 may also or instead be used for storing information and instructions to be executed by processor 1304. Memory 1306 may be directly connected or embedded within circuitry 1303 or a processor 1304. Or, memory 1306 may be coupled to and accessed via bus 1302. Memory 1306 also may be used for storing temporary variables, data units describing rules or policies, or other intermediate information during execution of program logic or instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, may optionally be provided and coupled to bus 1302 for storing information and instructions.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as an 802.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world-wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 may send and receive data units through the network(s), network link 1320, and communication interface 1318. In some embodiments, this data may be data units that the computer system 1300 has been asked to process and, if necessary, redirect to other computer systems via a suitable network link 1320. In other embodiments, this data may be instructions for implementing various processes related to the described techniques. For instance, in the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

Computer system 1300 may optionally be coupled via bus 1302 to one or more displays 1312 for presenting information to a computer user. For instance, computer system 1300 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

One or more input devices 1314 are optionally coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

As discussed, computer system 1300 may implement techniques described herein using customized hard-wired logic, one or more ASICs or FPGAs 1303, firmware and/or program logic, which in combination with the computer system causes or programs computer system 1300 to be a special-purpose machine. According to one embodiment, however, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media may also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 1300 may receive the data on the network and demodulate the signal to decode the transmitted instructions. Appropriate circuitry may then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
at each compute node of a plurality of compute nodes:
generating, at each compute process of a plurality of compute processes, a local vector comprising values for a common set of vector elements; and
for each vector element subset of a plurality of subsets in the common set of vector elements, based on each generated local vector, sending a vector chunk comprising values for the vector element subset out a port of the compute node that is associated with the vector element subset, each vector element subset associated with a different port of the compute node; and
at each compute-enabled switch of a plurality of compute-enabled switches:
receiving vector chunks over a plurality of switch ports, each compute node of the plurality of compute nodes connected to the compute-enabled switch via a different port of the plurality of switch ports;
reducing the vector chunks into a single result chunk, the vector chunks and the single result chunk each having values for a same vector element subset of the vector element subsets; and
sending the result chunk to each compute node of the plurality of compute nodes.

2. The method of claim 1, further comprising, at each particular compute process of the plurality of compute processes executing at each compute node of the plurality of compute nodes:
reducing particular chunks of local vectors generated by the plurality of compute processes at the compute node into a node chunk comprising values for a particular vector element subset, of the vector element subsets, that is assigned to the particular compute process;
sending the node chunk out a particular port of the compute node;
receiving, via the particular port, a particular result chunk comprising values for the particular vector element subset; and
sharing the particular result chunk with each other compute process in the plurality of compute processes at the compute node.

3. The method of claim 1, wherein reducing the vector chunks comprises, for each vector element in the vector element subset, performing one or more reduction operations between each value in the vector chunks that corresponds to the vector element, the reduction operations including one or more of summation, averaging, multiplying, selecting a minimum value, or selecting a maximum value.

4. The method of claim 1, wherein each compute process of the plurality of computing processes at each of the plurality of compute nodes belongs to a worker set executing a common distributed application, each result chunk generated by each compute-enabled switch forming, collectively, a result vector for that distributed application.

5. The method of claim 4, further comprising, at each compute-enabled switch of the plurality of compute-enabled switches, buffering, within a processing buffer for the distributed application, values only for a vector element subset assigned to the compute-enabled switch, and not for other elements in common set of vector elements.

6. The method of claim 1, wherein, at each compute process of the plurality of computing processes at each of the plurality of compute nodes:
generating the local vector comprises testing parameters of a model on a training data set assigned to the compute process, and calculating a local gradient based on results of the testing, the local vector being the local gradient, each vector element of the common set of vector elements corresponding to a different one of the parameters; and
the method further comprising: adjusting the parameters based on a result gradient formed by combining each result chunk generated by the plurality of compute-enabled switches, the result gradient having a single value for each vector element of the common set of vector elements.

7. The method of claim 1, wherein the plurality of compute devices and plurality of compute-enabled switches form a compute plane, the method further comprising:
at each particular compute-enabled switch of the plurality of compute-enabled switches, sharing, via an inter-plane communication mechanism, an intermediate result chunk with at least one other compute-enabled switch in another compute plane that is also assigned to reduce the same vector element subset as the particular compute-enabled switch, the intermediate result chunk having been reduced from the vector chunks that the particular compute-enabled switch received from the plurality of compute nodes; and
generating the result chunk to send back to the plurality of compute nodes in the same plane based also on one or more intermediate result chunks received via the inter-plane communication mechanism.

8. The method of claim 1, further comprising, at a particular compute process of the plurality of compute processes executing at each compute node of the plurality of compute nodes:
reducing particular chunks of local vectors generated by other compute processes at the compute node into two or more node sub-chunks, each of the sub-chunks comprising values for a different vector element subset assigned to the particular compute process;
sending each of the sub-chunks out a different port, of the compute node, that is coupled to the particular compute process; and
for each of the different vector element subsets assigned to the particular compute process:
receiving a particular result chunk comprising values for the vector element subset; and
sharing the particular result chunk with each other compute process at the compute node.

9. The method of claim 1, further comprising, at a given compute-enabled switch of the plurality of compute-enabled switches:
detecting an error related to the processing of vector data that the given compute-enabled switch receives; and
sending a message associated with that error out each of the plurality of switch ports.

* * * * *